United States Patent
Takechi et al.

(10) Patent No.: US 6,684,210 B1
(45) Date of Patent: Jan. 27, 2004

(54) FILE MANAGING SYSTEM, FILE MANAGEMENT APPARATUS, FILE MANAGEMENT METHOD, AND PROGRAM STORAGE MEDIUM

(75) Inventors: Hideaki Takechi, Osaka (JP); Hiroyuki Iitsuka, Katano (JP); Masazumi Yamada, Moriguchi (JP); Natsume Matsuzaki, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,791

(22) PCT Filed: Apr. 1, 1999

(86) PCT No.: PCT/JP99/01717
§ 371 (c)(1),
(2), (4) Date: Nov. 29, 2000

(87) PCT Pub. No.: WO99/52035
PCT Pub. Date: Oct. 14, 1999

(30) Foreign Application Priority Data

Apr. 6, 1998 (JP) .............................. 10/93594

(51) Int. Cl.[7] ........................... G06F 17/30; G06F 11/30
(52) U.S. Cl. ............................................. 707/9
(58) Field of Search .............................. 707/9; 713/201

(56) References Cited

U.S. PATENT DOCUMENTS

| | | | | |
|---|---|---|---|---|
| 5,857,021 A | * | 1/1999 | Kataoka et al. | 705/54 |
| 6,041,355 A | * | 3/2000 | Toga | 709/227 |
| 6,175,924 B1 | * | 1/2001 | Arnold | 713/189 |

FOREIGN PATENT DOCUMENTS

| | | |
|---|---|---|
| JP | 6-202987 | 7/1994 |
| JP | 7-110767 | 4/1995 |
| JP | 7-262001 | 10/1995 |
| JP | 08-263440 | 10/1996 |
| JP | 10-79174 | 3/1998 |

OTHER PUBLICATIONS

Japanese search report for PCT/JP99/01717 dated Aug. 3, 1999.
English translation of Form PCT/ISA/210.
A. Tanenbaum, "Operating Systems: Design and Implementation," 1987, Prentice–Hall International, Inc. pp. 289–298.
Gekkan Super Ascii, "Netscape Navigator vs. Internet Explorer Hojo Kinou," Dec. 1, 1996, vol. 7, No. 12, pp. 176–183.
Nikkei Electronics, "Software Fukugou No Kagio Nigiru Fusei Copy Boushi Gijutsu Ni Medo," Aug. 18, 1997, No. 696, pp. 110–120.

* cited by examiner

Primary Examiner—Jack Choules
(74) Attorney, Agent, or Firm—RatnerPrestia

(57) ABSTRACT

In the conventional file management system, there is a problem that even a file assigned permission information can be processed without considering any permission information. Therefore, the system includes a first accumulation device 2 for accumulating files to which permission information is added, and a new file management apparatus 7 for performing an input/output process on files with a request for a process from the application A 10 accessing the file management system taken into account according to the permission information added to the file. The new file management apparatus 7 compares the permission information added to the file in the first accumulation device 2 with the request contents of the process for the file from the application A 10, determines whether or not the process can be performed on the file, inputs the file from the first accumulation device 2 based on the result, and outputs it to the application A 10.

34 Claims, 18 Drawing Sheets

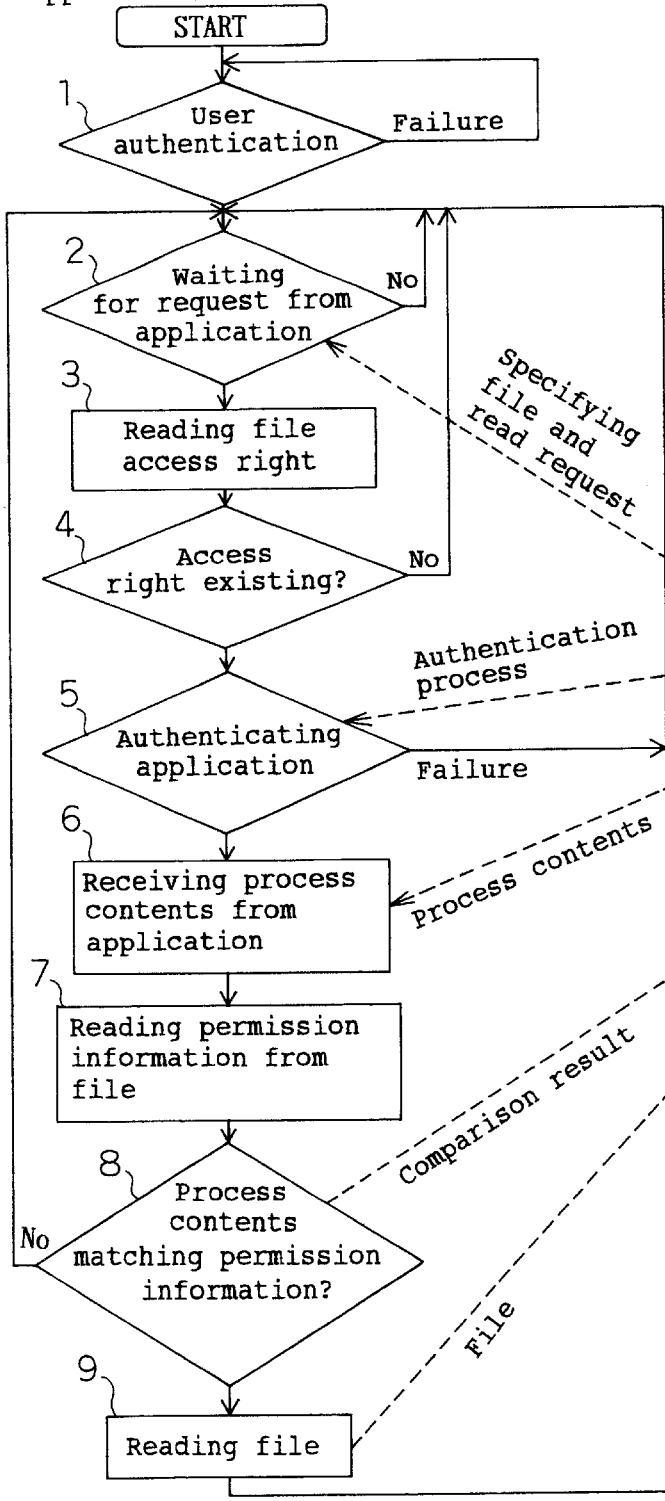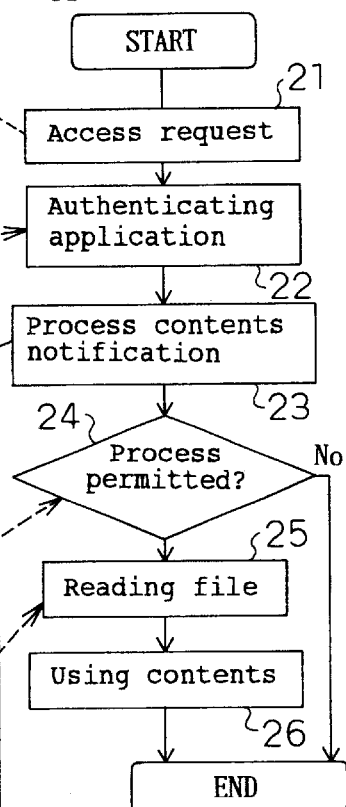
Fig. 3

Fig. 6

File accumulated in first accumulation device 2

| File name | Access right | Permission information | | | | | | Contents |
|---|---|---|---|---|---|---|---|---|
| | | Display | Copy | Move | Backup | Process | Copy generation | |
| File A | Yes | Permissible | Impermissible | Impermissible | Permissible | Impermissible | — | Picture data |
| File B | Yes | Permissible | Permissible | Permissible | Permissible | Permissible | — | Sentence data |
| File C | Yes | Permissible | Permissible | Permissible | Permissible | Permissible | 3 | Picture data |
| File D | Yes | Permissible | Permissible | Impermissible | Permissible | Impermissible | 3 | Picture data |

Fig. 7

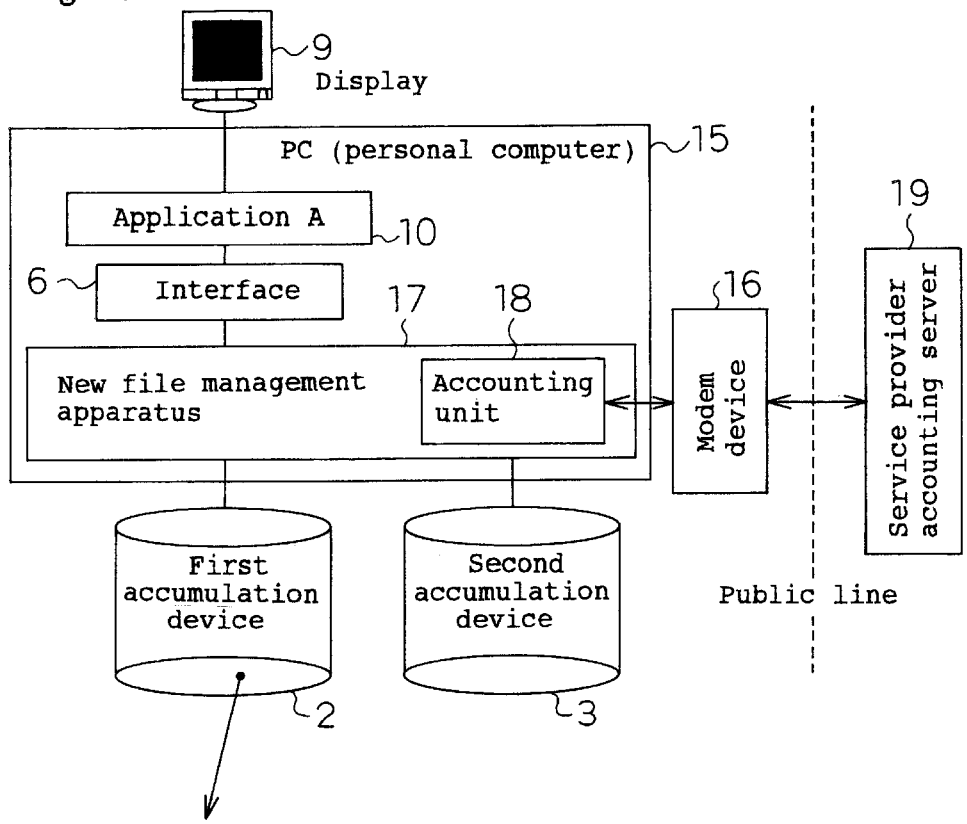

File accumulated in first accumulation device 2

| File name | Access right | Permission information ||||| Contents |
| --- | --- | --- | --- | --- | --- | --- | --- |
| | | Display | Copy | Move | Backup | Process | |
| File E | Yes | Permissible | Permissible | Impermissible | Permissible | Impermissible | Picture data |
| | | ¥300 | ¥1000 | — | Not required | — | |
| File F | Yes | Permissible | Permissible | Permissible | Permissible | Permissible | Picture data |
| | | Not required | Not required | Not required | Not required | Not required | |
| File G | Yes | Permissible | Impermissible | Impermissible | Impermissible | Impermissible | Picture data |
| | | Not required | Not required | Not required | Not required | Not required | |

Fig. 9

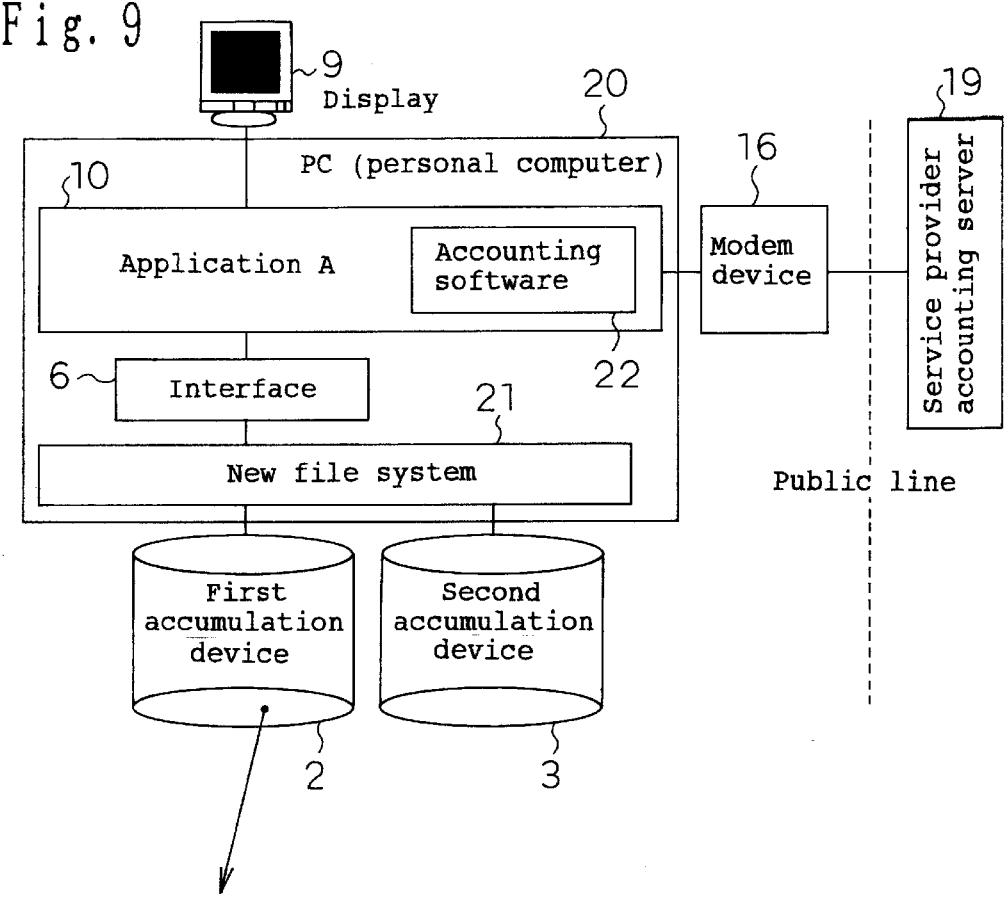

File accumulated in first accumulation device 2

| File name | Access right | Permission information ||||| Contents |
| --- | --- | --- | --- | --- | --- | --- | --- |
| | | Display | Copy | Move | Backup | Process | |
| File E | Yes | Permissible | Permissible | Impermissible | Permissible | Impermissible | Picture data |
| | | ¥300 | ¥1000 | — | Not required | — | |
| File F | Yes | Permissible | Permissible | Permissible | Permissible | Permissible | Picture data |
| | | Not required | Not required | Not required | Not required | Not required | |
| File G | Yes | Permissible | Impermissible | Impermissible | Impermissible | Impermissible | Picture data |
| | | Not required | Not required | Not required | Not required | Not required | |

File accumulated in first accumulation device 2

| File name | Access right | Permission information ||||| Contents |
| | | Display | Copy | Move | Backup | Process | |
|---|---|---|---|---|---|---|---|
| File H | Yes | Permissible | Permissible | Impermissible | Permissible | Impermissible | Picture data |
| | Over 18 | — | — | — | — | — | |
| File I | Yes | Permissible | Permissible | Permissible | Permissible | Permissible | Picture data |
| | | — | — | — | — | — | |

File accumulated in first accumulation device 2

| File name | Access right | Permission information ||||| Contents |
| --- | --- | --- | --- | --- | --- | --- | --- |
| | | Display | Copy | Move | Backup | Process | |
| File H | Yes | Permis-sible | Permis-sible | Imperm-issible | Permis-sible | Imperm-issible | Picture data |
| | Over 18 | — | — | — | — | — | |
| File I | Yes | Permis-sible | Permis-sible | Permis-sible | Permis-sible | Permis-sible | Picture data |
| | | — | — | — | — | — | |

Fig. 15

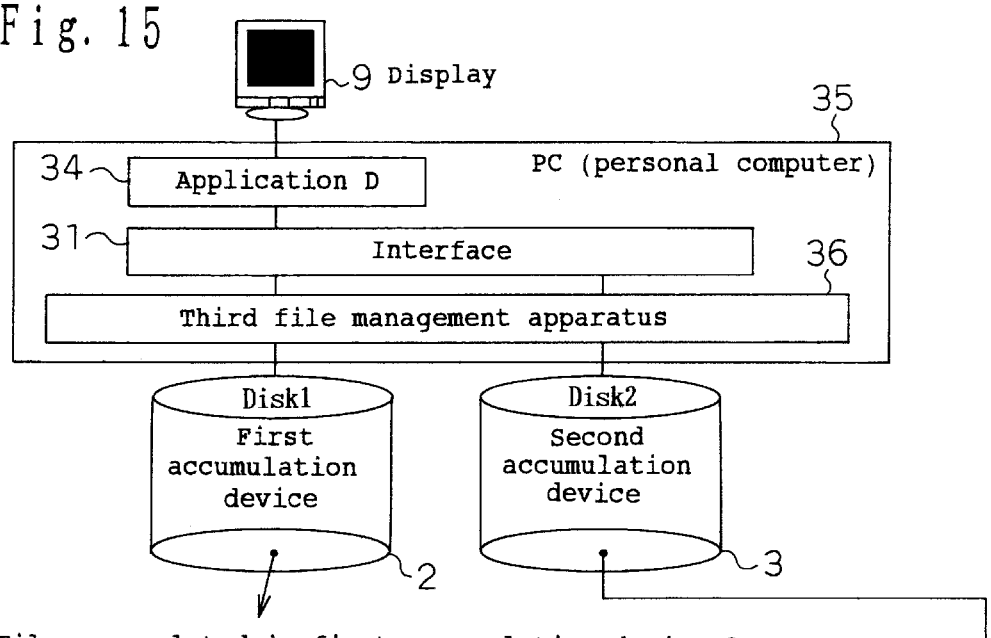

File accumulated in first accumulation device 2

| File name | Identification value (ID) | Access right | Permission information ||||| Conte-nts |
|---|---|---|---|---|---|---|---|---|
| | | | Display | Copy | Move | Backup | Process | |
| File J | Disk1 | Yes | Permis-sible | Imperm-issible | Imperm-issible | Permis-sible | Imperm-issible | Picture data |
| File K | Disk1 | Yes | Permis-sible | Permis-sible | Permis-sible | Permis-sible | Permis-sible | Picture data | file illegally copied and accumulated in second accumulation device 3

| File name | Identification value (ID) | Access right | Permission information ||||| Conte-nts |
|---|---|---|---|---|---|---|---|---|
| | | | Display | Copy | Move | Backup | Process | |
| File J | Disk1 | Yes | Permis-sible | Imperm-issible | Imperm-issible | Permis-sible | Imperm-issible | Picture data |
| File K | Disk1 | Yes | Permis-sible | Permis-sible | Permis-sible | Permis-sible | Permis-sible | Picture data |

File accumulated in third accumulation device 4

| File name | Access right | Contents | Permission information | |
|---|---|---|---|---|
| | | | Display | Copy |
| File L | Yes | Data | | |
| File M | No | Data containing permission information | Impermissible | Permissible |
| File N | Yes | Data containing permission information | Permissible | Permissible |

FILE MANAGING SYSTEM, FILE MANAGEMENT APPARATUS, FILE MANAGEMENT METHOD, AND PROGRAM STORAGE MEDIUM

This application is a U.S. National Phase Application of PCT international application PCT/JP99/01717.

TECHNICAL FIELD

The present invention relates to a file management system, a file management apparatus, and a file management method for managing files accumulated in a hard disk, etc. of a personal computer; a program storage medium storing a program of an application for use in a file management system; and a program storage medium storing a program for allowing a computer to perform each function of a file management apparatus.

BACKGROUND ART

Conventionally, the contents of files accumulated in a hard disk of a personal computer can be displayed on a display unit, and the files can be copied to a floppy disk of another disk drive. Described below is a system including a personal computer and a file accumulation device.

FIG. 16 is a block diagram of a display connected to the conventional file management system, an application for access to the system, and a display connected to the system. FIGS. 17 and 18 are flow charts of the operations of the conventional file management apparatus in a conventional file management system, and the operation of an application.

Before explaining the operation of the conventional system and application, the predetermined condition is described below. The predetermined condition is that a third accumulation device 4 has already accumulated three files, that is, files L, M, and N. Each of the files L, M, and N is designed to include the information about an access right and the data of the contents of each file as shown in FIG. 16. An access right refers to a right of a user to read a target file from, or write the target file to a conventional file management apparatus 8. When there are a plurality of users, the information about an access right is set for each of the users. However, for convenience of explanation, it is assumed that there is one user, that an access right to the files,L and N is assigned to the user 'Existing(YES)', and that an access right to the file M is not assigned to the user 'Not existing (NO)'. The data of the contents of, for example, the files M and N, can contain permission information indicating whether or not displaying the contents on a display 9 and copying the contents to a fourth accumulation device 5 are permissible. In addition, the data of the contents are encrypted. An application E 38 is a program having the function of displaying the contents of the files on the display 9. An application. F 39 is a program having the function of copying the files accumulated in the third accumulation device 4 to the fourth accumulation device 5.

Under the above described condition, the user is assumed to start the conventional system and application E 38. First, the user inputs the u name and the password of the user to the conventional file management apparatus 8 of a personal computer 37 using the keyboard connected to the personal computer 37. The keyboard is not shown in FIG. 16. Then, the conventional file management apparatus 8 confirms the name and the password of the user. If the name and the password have preliminary been registered, then the user is authenticated. (step 1 shown in FIG. 17). On the other hand, if the user name and/or password has not preliminary been registered, then the user is judged to be not authenticated, there by terminating the process (step 1 shown in FIG. 17). For convenience of explanation, it is assumed that the user has been. authenticated.

Then, the user instructs the application E 38 through the keyboard to request the conventional file management apparatus B to display on the display 9 the contents of any of the files accumulated in the third accumulation device 4. In this example, for convenience of explanation, it is assumed that an instruction to display the contents of the file N on the display 9 has been issued. The application E 38 issues an access request to the conventional file management apparatus 8 through an interface 6 (step 11 shown in FIG. 17). The conventional file management apparatus 8 receives the access request (step 2 shown in FIG. 17), reads the information about the access right to the file N of the third accumulation device 4 (step 3 shown in FIG. 17), and confirms the existence of the access right (step.4 shown in FIG. 17). As described above, since the information about the access right to the file N indicates 'Existing(YES)', that is, since the permission information that the user has the right to read and write the file N from and to the conventional file management apparatus 8 in the system is assigned to the file N, the conventional file management apparatus 8 reads the file N and passes it to the application E 38 through the interface 6 (step 5 shown in FIG. 17). If a target file is not the file N, but the file M, then access right information indicates 'Not existing(NO).' Therefore, the conventional file management apparatus 8 does not read the file M (step 4 shown in FIG. 17).

Then, the application E 38 reads the file N from the conventional file management apparatus 8 (step 12 shown in FIG. 17), further reads the permission information about the display of the file N, and confirms whether or not the permission information matches the request of the application E 38 to display the contents of the file N on the display 9 (step 13 shown in FIG. 17). Since the permission information about the display of the file N is 'Permissible' as shown in FIG. 16, that is, since the contents of the file N is permitted to be displayed on the display 9, the application E 38 decodes the encrypted data of the contents of the file N (step 14 shown in FIG. 17), and displays the result on the display 9 (step 15 shown in FIG. 17). However, if the permission information about the display of the file N is 'Impermissible,' then the application E 38 does not decode the encrypted data of the file N, or display the data on the display 9 (step 13 shown in FIG. 17). In addition, when the target file is not the file N, but the file L, the file L does not contain the permission information. Therefore, the application E 38 decodes the encrypted data of the file L, and displays the result on the display 9 (steps 14 and 15 shown in FIG. 17), or does not decode the encrypted data or display the contents on the display, 9.

Described below is the case in which the user uses the application F 39. In this case, for convenience of explanation, it is assumed that the user issues an instruction to copy the file N accumulated in the third, accumulation device 4 to the fourth accumulation device, 5.

Also in this case, the steps of the application F 39 up to the step of inputting and reading the file N (step 22 shown in FIG. 18) are the same as the steps of the application E 38 up to the step 12 shown in FIG. 17. In the subsequent steps, the application F 39 copies the file N to the fourth accumulation device 5 through the interface 6 and the conventional file management apparatus 8 without confirming the permission information about copying the filed N (step:23 shown in FIG. 18).

If the target file is not the file N, but the file L, then the file L is copied to the fourth accumulation device 5 as in the case of the file N (step 23 shown in FIG. 18). On the other hand, when the target file is the file M, the access right information about the file M is 'Not existing(NO).' Therefore, as in the case of the application E 38, the application F 39 does not receive the file M from the conventional file management apparatus 8.

Thus, when the application E 38 is used in the conventional file management system, a process is performed with the permission information assigned to a file taken into account. On the other hand, when the application F 39 is used, a copying process is performed without taking the permission information assigned to a file into account.

Therefore, conventionally, a file assigned the permission information, that is, even a file whose copyright should be protected can be displayed, copied, etc. That is, a file assigned the permission information can be illegally used.

In addition, when a file is not controlled in various processes such as the displaying, copying, moving, backup, and/or processing, etc., the read file is permitted to be copied, etc. As a result, a file cannot be protected against illegal access with convenience.

DISCLOSURE OF THE INVENTION

As described above, the present invention aims at providing a file management apparatus, a file management system including the file management apparatus, and a file management method for processing a file assigned permission information taken into account while, in the conventional file management system, there is the problem that a file assigned the permission information can be processed without consideration of the permission information.

Furthermore, the present invention also aims at providing a file management apparatus, a file management system including the file management apparatus, and a file management method f hr preventing a file whose author has the copyright, and whose copyright should be protected from being displayed, copied, moved, backup, and/or processed without permission of the author.

In addition, the present invention aims at providing a file management apparatus, a file management system including the file management apparatus, and a file management method for controlling the processes of displaying, copying, moving, backing up, and/or processing a file, and preventing illegal access with convenience of file.

One aspect of the present invention is a file management system, comprising:
   an accumulation device accumulating a file to which information about process restriction on the file is added; and
   a file management apparatus performing an input/output process on the file, in consideration of a request for a process from an application accessing said file management system and, according to the information about process restriction added to the file, characterized in that
   said file management apparatus compares the information about process restriction added to the file in said accumulation device with request contents of a process on the file from said application, determines whether or not the process should be performed on the file, inputs the file from said accumulation device based on the result, and outputs the file to the application.

Another aspect of the present invention is the file management system characterized in that:
   said file management apparatus and said application comprise authentication units;
   one of the authentication units performs an authentication process with another authentication unit;
   said authentication unit of said file management apparatus checks whether or not said application is authenticated;
   when the application is authenticated as a result of the authentication process, said file management apparatus determines whether or not application can process the file; and
   when the application is not authenticated as a result of the authentication process, said file management apparatus does not accept the request to process the file from the application.

Still another aspect of the present invention is the file management system characterized in that:
   said file management apparatus and said application comprise authentication units;
   one of the authentication units performs an authentication process with another authentication unit;
   said authentication unit of said file management apparatus checks whether or not said application is authenticated;
   when the application is authenticated as a result of the authentication process, said file management apparatus determines whether or not application can process the file; and
   when the application is not authenticated as a result of the authentication process, said file management apparatus reads all or a part of the information about process restriction added to the file in said accumulation device, and determines whether or not the application can process the file according to the read information.

Yet another aspect of the present invention is a program storage medium storing a program of an application used in the file management system according to the present invention.

Still yet another aspect of the present invention is a file management apparatus, characterized by comprising:
   a comparison unit comparing information about process restriction on a file in an accumulation device connected to the file management apparatus with request contents of a process on the file from the application accessing the file management apparatus; and
   an input/output unit determining whether or not the file can be processed based on a comparison result of said comparison unit, and inputting the file from said accumulation device and outputting the file to the application based on the result.

A further aspect of the present invention is the file management apparatus characterized in that:
   said file management apparatus comprises an authentication unit;
   said authentication unit and an authentication unit of the application perform an authentication process with each other;
   said authentication unit of the file management apparatus checks whether or not the application can be authenticated;
   when the application is authenticated as a result of the authentication process, said comparison unit performs the comparison process, and said input/output unit determines whether or not the application can process the file; and
   when the application is not authenticated as a result of the authentication process, said comparison unit does not accept the request to process the file from the application, and does not perform the comparison process.

The 7$^{th}$ invention of the present invention (corresponding to claim 16) is the file management apparatus according to the 5$^{th}$ invention, characterized in that:

said file management apparatus comprises an authentication unit;

said authentication unit and an authentication unit of the application perform an authentication process with each other;

said authentication unit of the file management apparatus checks whether or not the application can be authenticated;

when the application is authenticated as a result of the authentication process, said comparison unit performs the comparison process, and said input/output unit determines whether or not the application can process the file; and when the application is not authenticated as a result of the authentication process, said comparison unit reads all or a part of the information about process restriction added to the file in said accumulation device, and said input/output unit determines whether or not the application can process the file according to the read information.

A yet further aspect of the present invention is a program storage medium, characterized by storing a program for directing a computer to perform all or a part of each function of each component of the file management apparatus according to the present invention.

A still yet further aspect of the present invention is a file management system, comprising plural sets of:

an accumulation device accumulating a file to which information about process restriction on the file is added; and a file management apparatus performing an input/output process on the file in consideration of a request for a process from an application accessing said file management system according to the information about process restriction added to the file, characterized in that, said file management apparatus encrypts and adds to the file in a corresponding accumulation device a non-rewritable identification value specific to the accumulation device for specifying the corresponding accumulation device, and reads only the file to which the identification value of the corresponding accumulation device is added.

An additional aspect of the present invention is a file management system, comprising:

a plurality of accumulation devices accumulating a file to which information about process restriction on the file is added; and a file management apparatus performing an input/output process on the file in consideration of a request for a process from an application accessing said file management system according to the information about process restriction added to the file, characterized in that said file management apparatus encrypts and adds to the file accumulated in each of the plurality of accumulation devices a non-rewritable identification value specific to the accumulation device for specifying a corresponding accumulation device and reads only the file accumulated in an accumulation device corresponding to an added identification value.

A still additional aspect of the present invention is a file management apparatus, characterized in that to a file in an accumulation device connected to the file management apparatus, a non-rewritable identification value specific to the accumulation device for specifying the accumulation device is encrypted and added, and only the file to which the identification value of the accumulation device is added is read.

A yet additional aspect of the present invention is a file management apparatus, characterized in that to a file accumulated in each of a plurality of accumulation devices connected to the file management apparatus, a non-rewritable identification value specific to the accumulation device for specifying the corresponding accumulation device is encrypted and added, and only the file accumulated in the accumulation device corresponding to an added identification value is read.

A still yet additional aspect of the present invention is a program storage medium storing a program for directing a computer to perform all or a part of each function of the file management apparatus.

Another aspect of the present invention is a file management method, characterized by comprising the steps of:

comparing information about process restriction on a file in an accumulation device accumulating the file to which the information about process restriction on the file is added with request contents of a process of the file from an application accessing the file management system;

determining whether or not the process can be performed on the file based on the comparison; and inputting the file from said accumulation device based on the result, and outputting the file to the application.

Still another aspect of the present invention is a file management method, characterized by the steps of:

encrypting and adding a non-rewritable identification value specific to an accumulation device for specifying the accumulation device to a file in the accumulation device accumulating files; and reading only the file to which the identification value of said accumulation device is added.

Yet another aspect of the present invention is a file management method, characterized by comprising the steps of:

encrypting and adding a non-rewritable identification value specific to an accumulation device for specifying the accumulation device corresponding to a file accumulated in each of a plurality of accumulation devices accumulating files; and reading only the file accumulated in an accumulation device corresponding to an added identification value.

BRIEF DESCRIPTION OF THE DRAWINGS

FIG. 3 is a flowchart of the operations of a new file management apparatus and the operations of an application of the file management system according to the first embodiment of the present invention;

FIG. 6 shows all files accumulated in the first accumulation device of the file management system according to a third embodiment of the present invention;

FIG. 7 is a block diagram of the file management system according to a fourth embodiment of the present invention;

FIG. 9 is a block diagram, other than the block diagram shown in FIG. 7, of the file management system according to the fourth embodiment of the present invention;

FIG. 15 is a block diagram, other than the block diagram shown in FIG. 13, of the file management system according to the sixth embodiment of the present invention;

DESCRIPTION OF SYMBOLS

Figure 1:
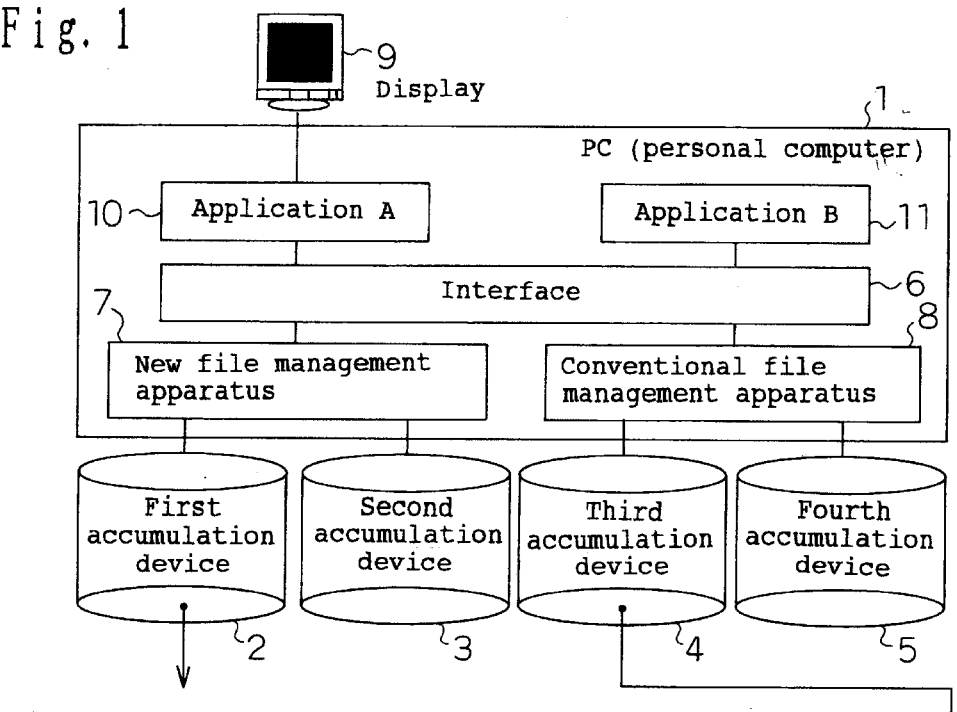
FIG. 1 is a block diagram of the file management system according to a first embodiment of the present invention.

1 Personal computer
2 First accumulation device
3 Second accumulation device
4 Third accumulation device
5 Fourth accumulation device
6 Interface
7 New file management apparatus
8 Conventional file management apparatus
9 Display
10 Application A
11 Application B
12 Authentication unit
13 Comparison unit
14 Input/output unit
15 Personal computer
16 Modem device
17 New file management apparatus
18 Accounting unit
19 Service provider accounting server
20 Personal computer
21 New file management apparatus
22 Accounting software
23 Personal computer
24 New file management apparatus
25 Determination unit
26 Application C
27 Personal computer
28 New file management apparatus
29 Determination software
30 Personal computer
31 Interface
32 First file management apparatus
33 Second file management apparatus
34 Application D
35 Personal computer
36 Third file management apparatus
37 Personal computer
38 Application E
39 Application F

BEST MODE FOR CARRYING OUT THE INVENTION

The embodiments of the present invention will be

First Embodiment

Described is the configuration of the file management system according to a first embodiment of the present invention.

FIG. 1 is a block diagram of the file management system according to the first embodiment of the present invention. The file management system according to the first embodiment comprises a personal computer 1, a first accumulation device 2, a second accumulation device 3, the third accumulation device 4, and the fourth accumulation device 5. The personal computer 1 comprises the interface 6, a new file management apparatus 7, and the conventional file management apparatus 8. The personal computer 1 is connected to the display 9, and FIG. 1 also shows the display 9. In addition, FIG. 1 shows an application A 10 and an applications B 11 for use in the first embodiment.

Described below is each component means of the personal computer 1.

The interface 6 is means for interfacing a file, etc. between the new file management apparatus 7 and the application A 10. In addition, the interface 6 is also means for interfacing a file, etc. between the conventional file management apparatus 8 and the application B 11.

Figure 2:
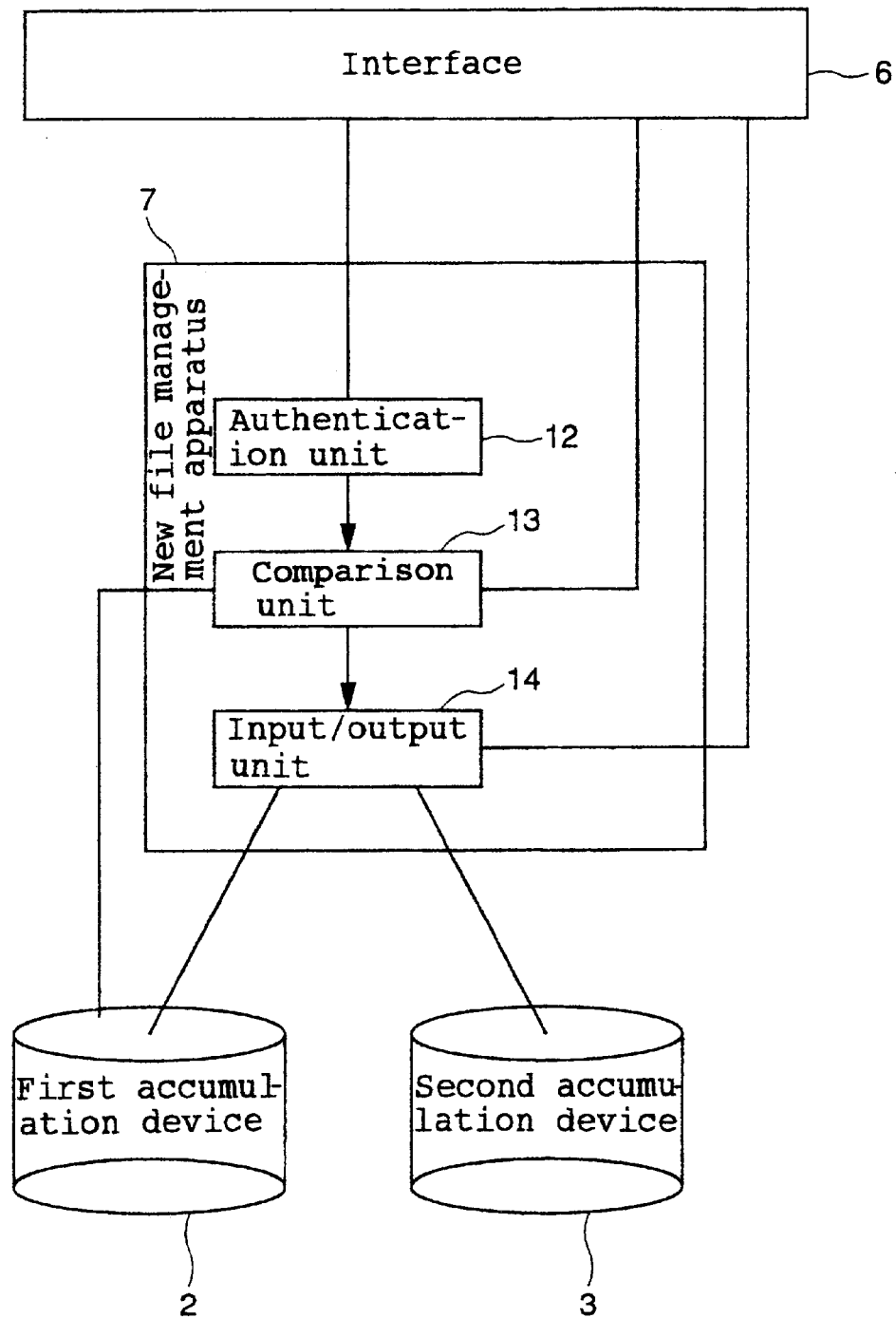
FIG. 2 is a block diagram showing each component of a new file management apparatus in the file management system according to the first embodiment of the present invention.

The new file management apparatus 7 inputs the information about access rights to files accumulated in the first accumulation device 2, the information about processing a file, and files from the first accumulation device 2, inputs the request information from the application A 10 through the interface 6, and performs an input/output process on files. In the descriptions below, the information about the above described processes is referred to as permission information. The request information from the application A 10 is described later when the operations of the file management system according to the first embodiment of the present invention are described. As shown in FIG. 2, the new file management apparatus 7 comprises an authentication unit 12, a comparison unit 13, and an input/output unit 14. The authentication unit 12, the comparison unit 13, and the input/output unit 14 are also described later when the operations of the file management system according to the first embodiment are described.

The conventional file management apparatus 8 is the same as the apparatus described in the 'Background Art.' That is, the conventional file management apparatus 8 inputs the information about the access rights to the files accumulated in the third accumulation device 4, the permission information, and the files from the third accumulation device 4, inputs the access request from the application B 11 through the interface 6, and performs the file input/output process.

Described below are the first accumulation device 2, the second accumulation device 3, the third accumulation device 4, the fourth accumulation device 5, the display 9, the application A 10, and the application B 11 in this order.

The first accumulation device,2, the second accumulation device 3, the third accumulation device 4, and the fourth accumulation device 5 are devices for accumulating files.

The first accumulation device 2 has already accumulated two files A and B, and each of the files A and B is assumed to comprise access right information, permission information, and contents data as shown in FIG. 1. An access right refers to what has been described in 'Background Art,' and indicates a right for a user to make the new file management apparatus 7 read and write a target file. When there are a plurality of users, information about the access right is prepared for each user. For convenience of explanation, it is assumed that there is only one user, and that the information of access right 'existing (YES)' to the files A and B is assigned to the user. Permission information refers to information specifying whether or not the contents of a file are permitted to be displayed on the display 9, copied, moved, backed up to the second accumulation device 3, or processed. It is assumed that the permission information is prepared independently of the processes of display, copy, move, backup, and processing. To back up refers to permitting a target file to be copied only to the second accumulation device 3, and after the copying process, to permitting a target file to be copied again only to the first accumulation device 2. Furthermore, the contents of a file refer to whether the file is a picture or sentences or the like.

The second accumulation device 3 is assumed not to accumulate any file when the file management system according to the first embodiment of the present invention starts to operate.

The third accumulation device 4 is assumed to be what has been described in the 'Background Art,' and accumulates the files L, M, and N. Since the files L, M, and N are described in the 'Background Art,' the descriptions are omitted here.

Like the second accumulation device 3, the fourth accumulation device 5 is assumed not to accumulate any file when the file management system according to the first embodiment of the present invention starts to operate. The fourth accumulation device 5 is what has been described in the 'Background Art.'

The display 9 is a unit for displaying the contents of the files A and B accumulated in the first accumulation device 2.

The application A 10 is a program having the function of copying the files A and B accumulated in the first accumulation device 2 to the second accumulation device 3, and having the function of an authentication unit. In addition, the application A 10 observes the permission information about the files A and B, and is an authenticated application corresponding to the new file management apparatus 7.

The application B 11 is a program having the function of copying the files L, M, and N accumulated in the third accumulation device 4 to the fourth accumulation device 5, and having the function of an authentication unit. However, the application B 11 does not observe the permission information about the files A and B, and is an illegal application not corresponding to the new file management apparatus 7.

The first accumulation device 2 is used as an accumulation unit, and the new file management apparatus 7 is used as a file management apparatus according to claim 1 of the present invention. A program storage medium storing the program of the application A 10 is used as a program storage medium according to claim 13 of the present invention. In addition, the new file management apparatus 7 is used as a file management apparatus according to claim 14 of the present invention. Furthermore, a process not requiring storing a file in a data storage medium accessing the present file management system according to claims 6 and 19 indicates displaying the contents of the files on the display 9.

Described below is the operation of the file management system according to the first embodiment of the present invention.

First, the case in which the user uses the file management system and the application A 10 according to the first embodiment of the present invention is described below by referring to FIG. 3. FIG. 3 is a flowchart of the operation of the new file management apparatus 7, and the operation of the application A 10 of the file management system.

First, the user inputs the name of the user and his or her password to the new file management apparatus 7 of the personal computer 1 using a keyboard connected to the personal computer 1. However, the keyboard is not shown in FIG., 1. Then, the new file management apparatus 7 confirms the name and the password of the user, and determines that the user is authenticated if the name and the password of the user have already registered (step 1 shown in FIG. 3). On the other hand, if the name and/or the password of the user has not yet been registered, it is determined that the user is not authenticated, thereby terminating the operation (step 1 shown in FIG. 3). In this example, for convenience of explanation, it is assumed that the user has been authenticated.

Then, using a keyboard, the user issues to the application A 10 an instruction to direct the new file management apparatus 7 to request to copy any of the files accumulated in the first accumulation device 2 to the second accumulation device 3. In this case, for convenience of explanation, it is assumed that an instruction to copy the file A to the second accumulation device 3 is issued. The application A 10 issues an access request to the new file management apparatus 7 through the interface 6. (step 21 shown in FIG. 3). The access request refers to specifying a file, and requesting to read the file. In this case, it refers to requesting to read the file A in the first accumulation device 2. Then, the new file management apparatus 7 inputs an access request from the application A 10 (step 2 shown in FIG. 3), the information about the access right of the file A of the first accumulation device 2 is read (step 3 shown in FIG. 3), and the existence of the access right is confirmed (step 4 shown in FIG. 4). As described above, or as shown in FIG. 1, confirm that the information about the access right of the file A is 'existing' (YES).

Then, the authentication unit 12 provided in the new file management apparatus 7 performs an authentication process using the function of the authentication unit of the application A 10 (steps 5 and 22 shown in FIG. 3). The authentication process is performed by the authentication unit 12 having the problem and the solution to the problem, issuing the problem to the application A 10 through the interface 6, by the application A 10 answering the problem through the interface 6, and by the authentication unit 12 comparing the solution with the answer from the application A 10. If the solution matches the answer, it indicates successful authentication, and the authentication unit 12 authenticates the application A 10. On the other hand, if the solution does not match the answer, it indicates authentication failure, and the authentication unit 12 does not authenticate the application A 10. As described above, the application A 10 is an authenticated application corresponding to the new file management apparatus 7, thereby successfully authenticating the application A 10.

If the application A 10 is authenticated, it issues a request to the comparison unit 13 of the new file management apparatus 7 through the interface 6 to copy the file A accumulated in the first accumulation device 2 to the second accumulation device 3 (step 23 shown in FIG. 3). The comparison unit 13 provided in the new file management apparatus 7 inputs the request (step 6 shown in FIG. 3), reads the permission information about the copy of the file A from the first accumulation device 2, and determines whether or not the permission information indicates 'Permissible' (steps 7 and 8 shown in FIG. 3). As shown in FIG. 1, since the permission information about the copy of the file A indicates 'Impermissible,' the comparison unit 13 outputs the information that the copy request; from the application A 10 is not acceptable to the application A 10 through the interface 6 (step 8 shown in FIG. 3). The application A 10 inputs the information that the copy request from the comparison unit 13 is not acceptable (step 24 shown in FIG. 3), and stops copying the file A accumulated in first accumulation device 2 to the second accumulation device 3.

Described below is the case in which a target file is not the file A, but the file B. This case is the same as the case of the file A up to the step of the comparison unit 13 provided in the new file management apparatus 7 reading the permission information about the, copy of the file B from the first accumulation device 2. That is, the operation is the same as the operation up to the step 7 shown in FIG. 3.

Since the permission information about the copy of the file B is. 'Permissible,' the comparison unit 13 first reads the permission information, and outputs the information that a copy request from the application A 10 is acceptable to the application A 10 through the interface 6 (step 8 shown in FIG. 3). Then, the input/output unit 14 provided in the new file management apparatus 7 reads the file B from the first accumulation device 2, and outputs the file B to the application A 10 through the interface 6 (step 9 shown in FIG. 3). The application A 10 inputs and reads the file B from the input/output unit 14 (step 25 shown in FIG. 3), and copies the file B to the second accumulation device 3 through the interface 6 and the input/output unit 14 of the new file management apparatus 7 (step 26 shown in FIG. 3).

The operation performed when the file management system and the application A 10 are associated has been described above. Described below is the operation performed when the file management system and the application B 11 are associated. In this case, the user issues an instruction to the application B 11 to have the new file management apparatus 7 request to copy the file A accumulated in the first accumulation device 2 to the second accumulation device 3.

In this case, the authentication unit 12 provided in the new file management apparatus 7 performs an authentication process using the function of the authentication unit of the application B 11 (steps 5 and 22 shown in FIG. 3) as described above in the case of the application A 10. However, since the application B 11 is an illegal application which does not correspond to the new file management apparatus 7, the authentication unit 12 authenticates the application B 11 as an illegal application, thereby failing in authentication. Thus, if the authentication fails, the new file management apparatus 7 does not accept any request from the application. B 11. In addition, a file to be processed is a file A, but the authentication fails although the file to be processed is a file B, and the new file management apparatus 7 does not accept any request from the application B 11.

However, when the user issues an instruction to the application B 11 to have the conventional file management apparatus 8 request to copy any file accumulated in the third accumulation device 4 to the fourth accumulation device 5, the operation is the same as the operation in the case of the application F 39 described in the 'Background Art,' and the explanation is omitted here.

As described above, unlike the conventional file management system, the file management system according to the first embodiment of the present invention does not copy a file with the permission information ignored.

In addition, according to the first embodiment of the present invention, the determination as to whether or not the user is authenticated, and the authentication process performed between the authentication unit 12 provided in the new file management apparatus 7 and the function of the authentication unit of the application A 10 or the application B 11 are not limited to the above described example.

Second Embodiment

Described below are the configuration and the operation of the file management system according to a second embodiment of the present invention.

Figure 4:
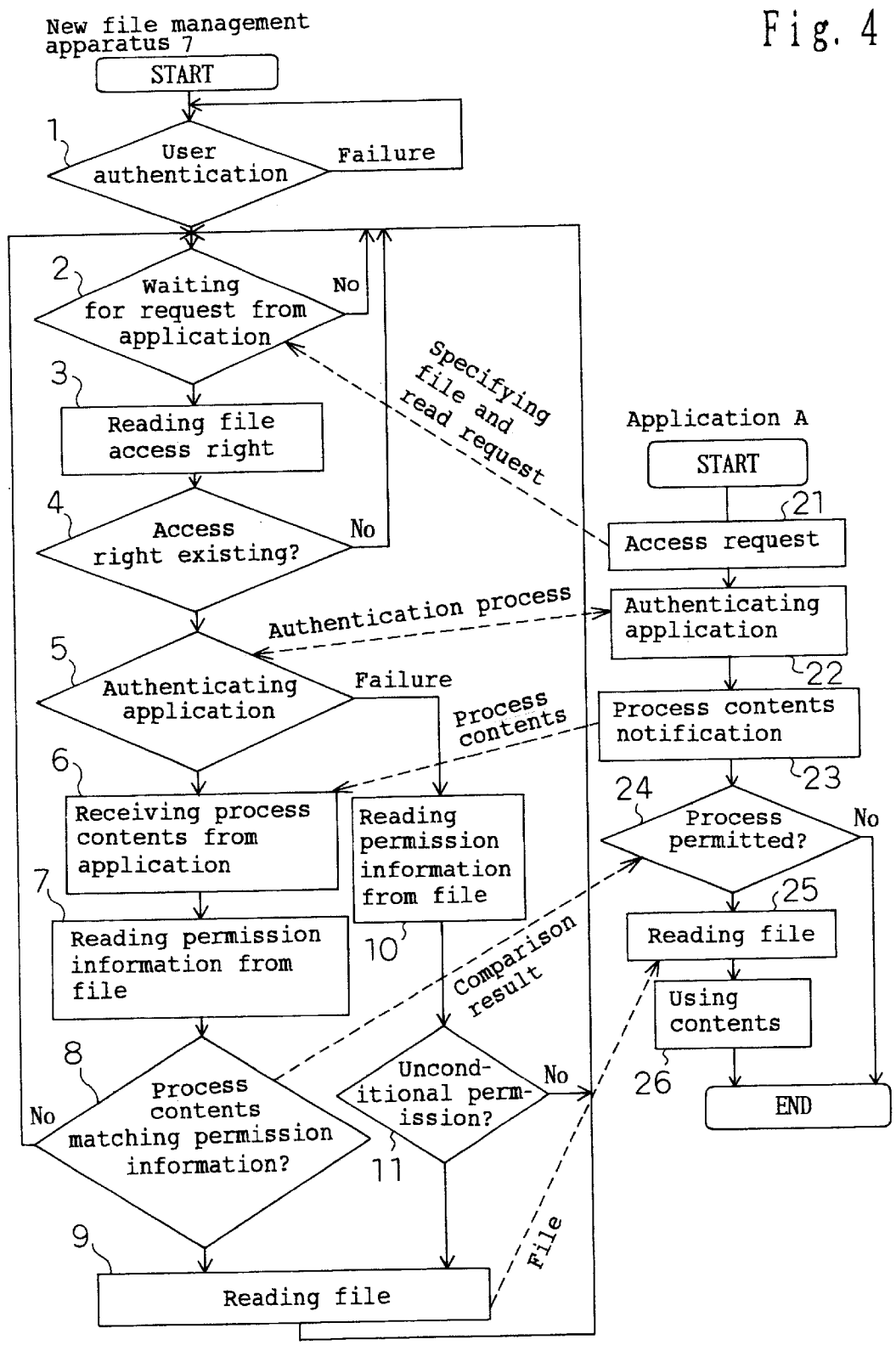
FIG. 4 is a flowchart of the operations of a new file management apparatus and the operations of an application A of the file management system according to a second embodiment of the present invention.
Figure 5:
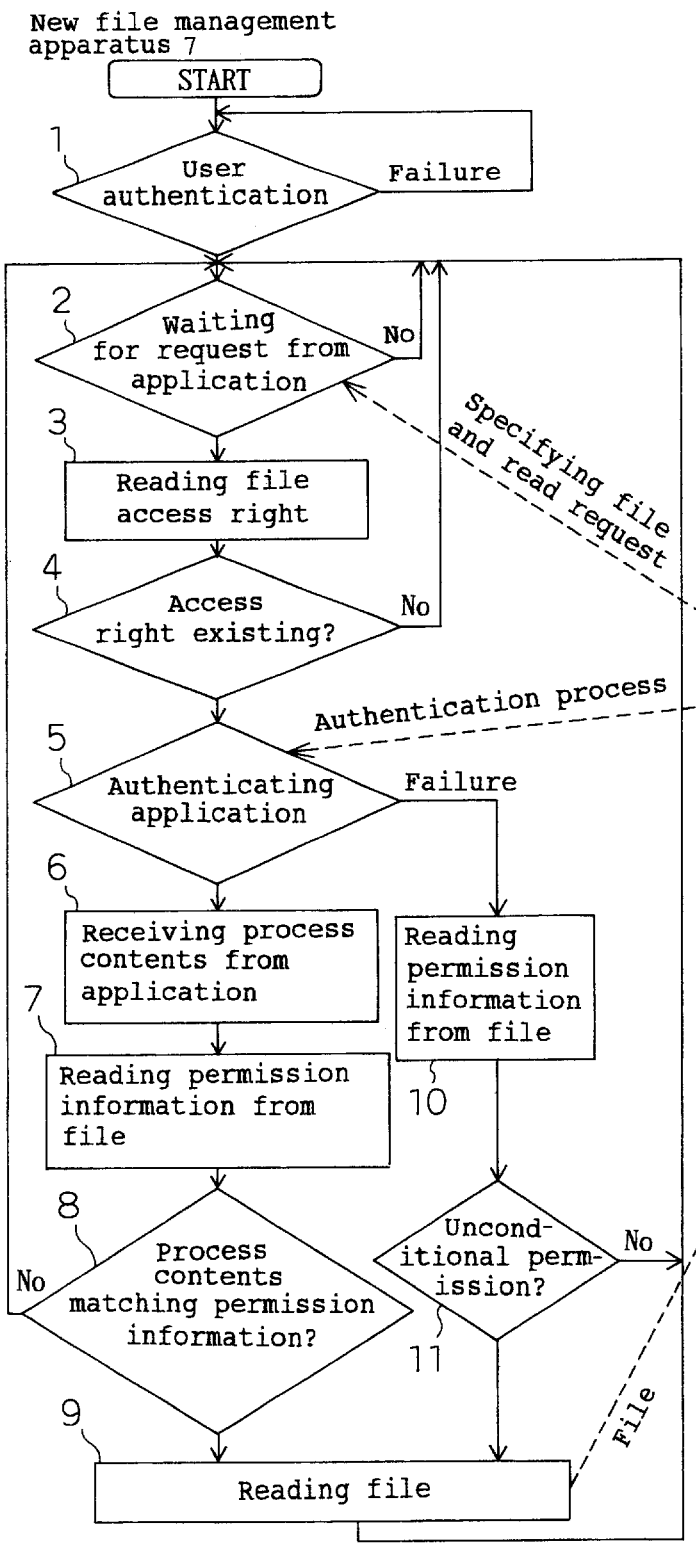
FIG. 5 is a flowchart of the operations of a new file management apparatus and the operations of an application B of the file management system according to the second embodiment of the present invention.

According to the second embodiment of the present invention, when the above described authentication according to the first embodiment fails, there is a difference from the first embodiment, and the difference is described below mainly by referring to FIGS. 4 and 5. FIG. 4 is a flowchart of the operation of the new file management apparatus 7 of the file management system, and the operation of the application A 10. FIG. 5 is a flowchart of the operation of the new file management apparatus 7 of the file management system, and the operation of the application B 11. The operation of the file management system according to the second embodiment of the present invention is different from the operation of the file management system according to the first embodiment of the present invention, but the configuration of the file management system is the same as the configuration shown in FIG. 1.

First, the operation in the case in which the file management system and the application A 10 are associated is described by referring to FIG. 4. In this case, the authentication according to the first embodiment in steps 5 and 22 shown in FIG. 3 indicates a successful result. That is, since the authentication in steps 5 and 22 shown in FIG. 4 is successful, the subsequent operations are the same as the operations according to the first embodiment of the present invention.

Next, the operation in the case in which the file management system and the application B 11 are associated is described by referring to FIG. 5. In this case, the authentication according to the first embodiment in steps 5 and 22 shown in FIG. 3 fails. That is, the authentication in steps 5 and 22 shown in FIG. 5 fails.

When the authentication fails, the comparison unit 13 provided in the new file management apparatus 7 not only reads the permission information about the copy of the file A from the first accumulation device 2, but also reads the permission information about the display, move, backup, and processing, that is, reads all permission information about the file A shown in FIG. 1, and checks all permission information whether or not it indicates 'Permissible' (steps 10 and 11 in FIG. 5).

Since the permission information about file A contains the information 'Impermissible,' the input/output unit 14 performs no processes. As a result, the application B 11 cannot input the file A.

In the example above, the target file is the file A. Described below is the case in which the target file is the file B. In this case, the comparison unit 13 provided in the new file management apparatus 7 reads all permission information about the file B from the first accumulation device 2, and checks all permission information whether or not it indicates 'Permissible' (steps 10 and 11 shown in FIG. 5). Since all permission information about the file B indicates 'Permissible' as shown in FIG. 1, the input/output unit 14 determines that the file B is an accessible file, reads the file B from the first accumulation device 2, and outputs the file B to the application B 11 through the interface 6 (step 9 in FIG. 5). Then, the application B 11 inputs and reads the file B from the input/output unit 14, and copies the file B to the second accumulation device 3 through the input/output unit 14 (steps 25 and 26 in FIG. 5).

As described above, unlike the file management system according to the first embodiment of the present invention, the file management system according to the second embodiment of the present invention outputs any accessible file to an application although the application is not authenticated, or although it is illegal, that is, although the application fails in authentication. Therefore, a manufacturer can freely generate an application accessing any accessible file, which is greatly convenient.

Third Embodiment

Described below are the configuration and the operation of the file management system according to a third embodiment of the present invention.

According to the third embodiment of the present invention, when the above described authentication according to the second embodiment fails, there is a difference from the second embodiment, and the difference is described below by referring to FIG. 6. FIG. 6 shows all files accumulated in the first accumulation device 2 of the file management system, and in addition to the above described files A and B, files C and D are accumulated in the first accumulation device 2. The permission information about 'copy generation' shown in FIG. 6 is the information specifying the file generation to be copied, and indicates the generation number allowed to be copied. For example, the file C is assigned the number '3,' and the three generations can be copied. However, each time a copy is made, the generation number to be copied is reduced by 1.

When the file management system and the application B 11 are associated, the authentication fails as described above in the second embodiment.

When the authentication fails, the comparison unit 13 provided in the new file management apparatus 7 does not read the permission information about the copy of the file A from the first accumulation device 2, but reads the permission information about the display, move, backup, processing, and a copy generation about the file A shown in FIG. 6, and checks whether or not the permission information about anything but the 'copy generation' indicates 'Permissible' (steps 10 and 11 in FIG. 5), and confirms the number of the permission information about the 'copy generation' (step 11 shown in FIG. 5). The comparison unit 13 does not read the permission information about the copy because, if the permission information about the 'copy generation' is assigned a number other than 0, it indicates the permission for a copy. However, if the number 0 is assigned, then it indicates 'Impermissible' copy. In addition, no number is assigned to the permission information about the 'copy generation,' it indicates 'Permissible'.

Since the permission information about file A contains the information 'Impermissible,' the input/output unit 14 performs no processes. As a result, the application B 11 cannot input the file A.

Described below is the case in which the target file is the file B. In this case, as shown in FIG. 6, the permission information about the file B does not contain the information about the copy generation. However, all other permission information indicates 'Permissible,' and the input/output unit 14 reads the file B from the first accumulation device 2, and outputs the file B to the application B 11 through the interface 6 (step 9 shown in FIG. 5). Then, the application B 11 inputs and reads the file B from the input/output unit 14, and copies the file B to the second accumulation device 3 through the interface 6 and the input/output unit 14 (steps 25 and 26 shown in FIG. 5)

Described below is the case in which the target file is a file C. In this case, as shown in FIG. 6, the file C contains the permission information that the generation up to 3 can be copied. This indicates that the copying operation can be performed. At this time, the comparison unit 13 does not read the permission information about the copy of the file C, reads the permission information about anything but the copying operation, checks whether or not the permission information about anything but the 'copy generation' indicates 'Permissible' (steps 10 and 11 shown in FIG. 5), and confirms the number of the permission information about the 'copy generation' (step 11 shown in FIG. 5). As described above, since the number of the permission information of the 'copy generation' is 3, indicating the permissibility of copying the file C, and all other permission information indicates 'Permissible,' the input/output unit 14 reads the file C from the first accumulation device 2, and outputs the file C to the application B 11 through the interface 6 as in the case of the file B (step 9 shown in FIG. 5). Then, the application B 11 inputs and reads the file C from the input/output unit 14, and copies the file C to the second accumulation device 3 through the interface 6 and the input/output unit 14 (steps 25 and 26 shown in FIG. 5).

Described below is the case in which the target file is a file D. In this case, as shown in FIG. 6, the file D contains the permission information indicating that the generation up to 3 can be copied. At this time as well, the comparison unit 13 reads the permission information about anything but the copying operation, checks whether or not the permission information about anything but the 'copy generation' indicates 'Permissible' (steps 10 and 11 shown in FIG. 5), and confirms the number of the permission information about the 'copy generation' (step 11 shown in FIG. 5). As shown in FIG. 6, since the information 'Impermissible' is contained in the permission information of the file D, the input/output unit 14 performs no processes. As a result, the application B 11 cannot input the file D.

In the above described third embodiment, each file is assigned the permission information 'copy generation.'

However, each file can be assigned the permission information 'copy date,' not 'copy generation,' for specification of the date on which a file can be copied. In this case, the file assigned the permission information 'copy date' indicates the automatic permission of a copying operation. In this case, the operation similar to the operation performed on a file containing the permission information 'copy generation' as described above is performed with the 'copy generation' replaced with the 'copy date,' and with the 'copy date ' indicating the date on which the copying operation can be performed taken into account.

In addition, the permission information 'move date,' not the above described 'copy date,' can be assigned to a file. For such a file, the operation similar to the operation performed on a file containing the permission information 'copy date' is performed with the 'copy date' replaced with the 'move date,' and with the 'move date' indicating the date on which the a file can be moved taken into account.

Furthermore, according to the above described first through third embodiments, the application A 10 is a program having the function of copying the files accumulated in the first accumulation device 2 to the second accumulation device 3, but the application A 10 can be a program having the function of displaying a file on the display 9, moving, backing up, and processing it to the second accumulation device 3. At this time, as long as the above described copying operation is replaced with the displaying, moving, backing up, or processing operation, and the combination of the processes and the permission information about a target file is considered, the above described first through third embodiments can be realized.

Fourth Embodiment

Described below is the configuration of the file management system according to a fourth embodiment of the present invention.

The file management system according to the fourth embodiment comprises, as shown in FIG. 7, the personal computer 15 different from the personal computer 1 of the file management system according to the first embodiment, the first accumulation device 2, the second accumulation device 3, and the modem device 16. The personal computer 15 comprises the new file management apparatus 17 different from the new file management apparatus 7 of the personal computer 1. The new file management apparatus 17 comprises the accounting unit 18 in addition to each component unit of the new file management apparatus 7. The accounting unit 18 is connected to the modem device 16 and the modem device. 16 is connected to the service provider accounting server 19 through a public line. In addition, the first accumulation device 2 accumulates files E, F, and G different from the files A and B. As shown in FIG. 7, the files E, F, and G contain the accounting information for each permission information for specifying whether or not the user is charged a predetermined fee in processing the permission information together with the information about an access right, the permission information, and the contents data composing the files A and B shown in FIG. 1. For example, to the file E, the accounting information is added to request that the user should be charged the fee of 300 yen in response to the display on the display 9.

Described below is the operation of the file management system according to the fourth embodiment of the present invention.

Figure 8:
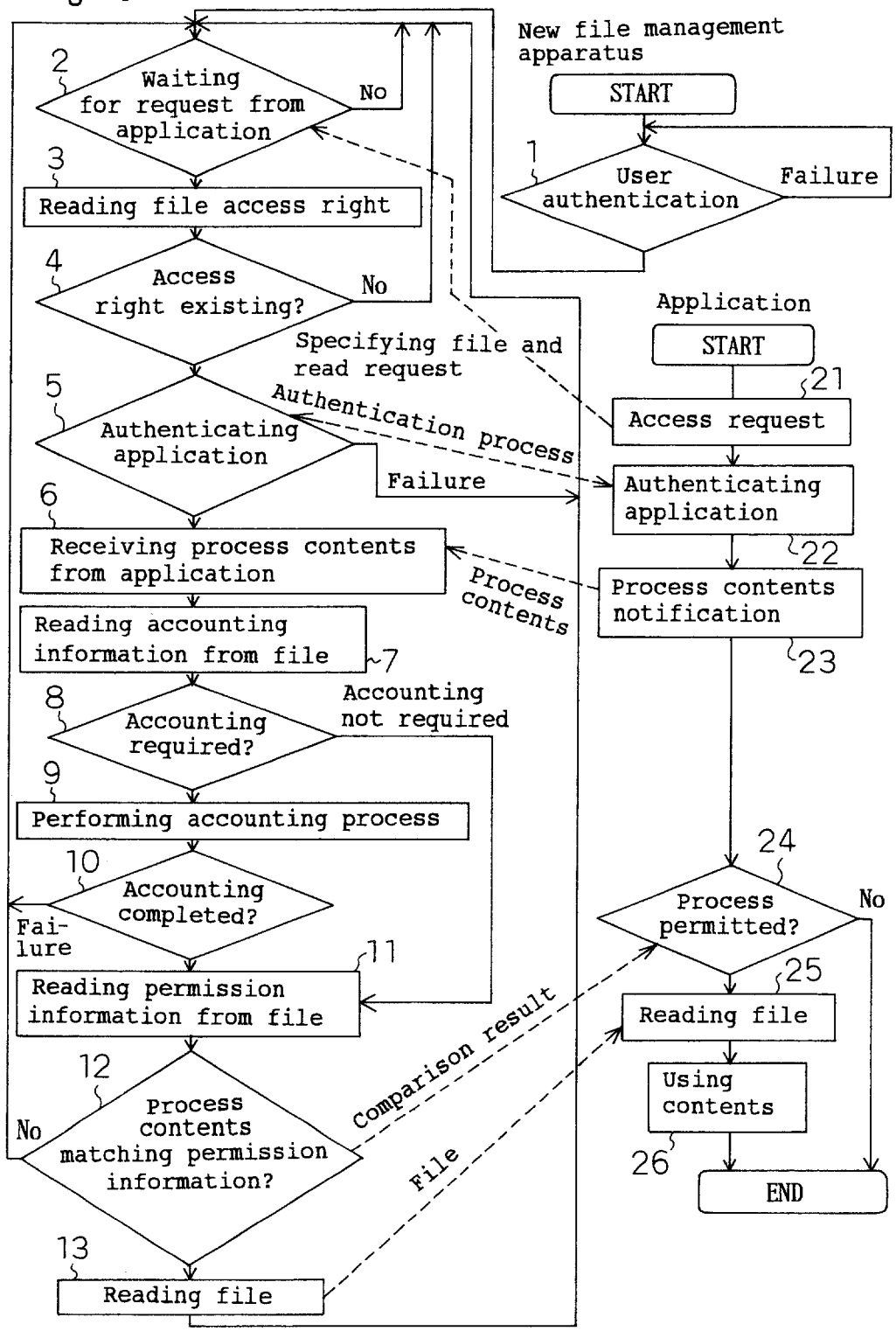
FIG. 8 is a flowchart of the operations of a new file management apparatus and the operations of an application of the file management system according to the fourth embodiment of the present invention.

FIG. 8 is a flowchart of the operation of the new file management apparatus 17 of the file management system according to the fourth embodiment, and the operation of an application. In addition, for convenience in explanation below, the operations of the new file management apparatus 17 and the application A 10 are shown.

The new file management apparatus 17 and the application A 10 operate similarly as in the first embodiment. The new file management apparatus 17 authenticates the application A 10. If the authentication succeeds, the application A 10 issues a request through the interface 6 to copy the file E accumulated in the first accumulation device 2 to the second accumulation device 3 to the new file management apparatus 17 (step 23 shown in FIG. 8). Then, in step 11 shown in FIG. 8, before the comparison unit 13 reads the permission information about the file E the accounting unit 18 provided in the new file management apparatus 17 inputs and reads the accounting information about copying the file E from the first accumulation device 2 (step 7 shown in FIG. 8), and checks whether or not the information about a request for a user to be charged a predetermined fee is added to the accounting information (step 8 shown in FIG. 8). Since the accounting information about copying the file E is the information about a request for a user to be charged the copying fee of 1000 yen as shown in FIG. 7, the accounting unit 18 displays the accounting information on the display 9 through the interface 6 and the application A 10, and charges the user 1000 yen (step 9 shown in FIG. 8). When the user uses a keyboard, etc. and pays the service provider accounting server 19 1000 yen for the fee through the accounting unit 18 and the modem device 16, the service provider accounting server 19 outputs the information that the fee of 1000 yen has been paid by the user to the accounting unit 18 through the modem device 16 (step 10 shown in FIG. 8). Then, control is passed to step 11 shown in FIG. 8, and the processes in and after step 11 are similar to the operations according to the first embodiment.

Up to this point, the file E is a target file. When the file F or G is a target file, the accounting information about a copying operation is the information that the user is not charged a fee for copying. Therefore, control is passed to step 11 after step 8 shown in FIG. 8. Afterwards, the operations similar to those of the first embodiment are performed.

Figure 10:
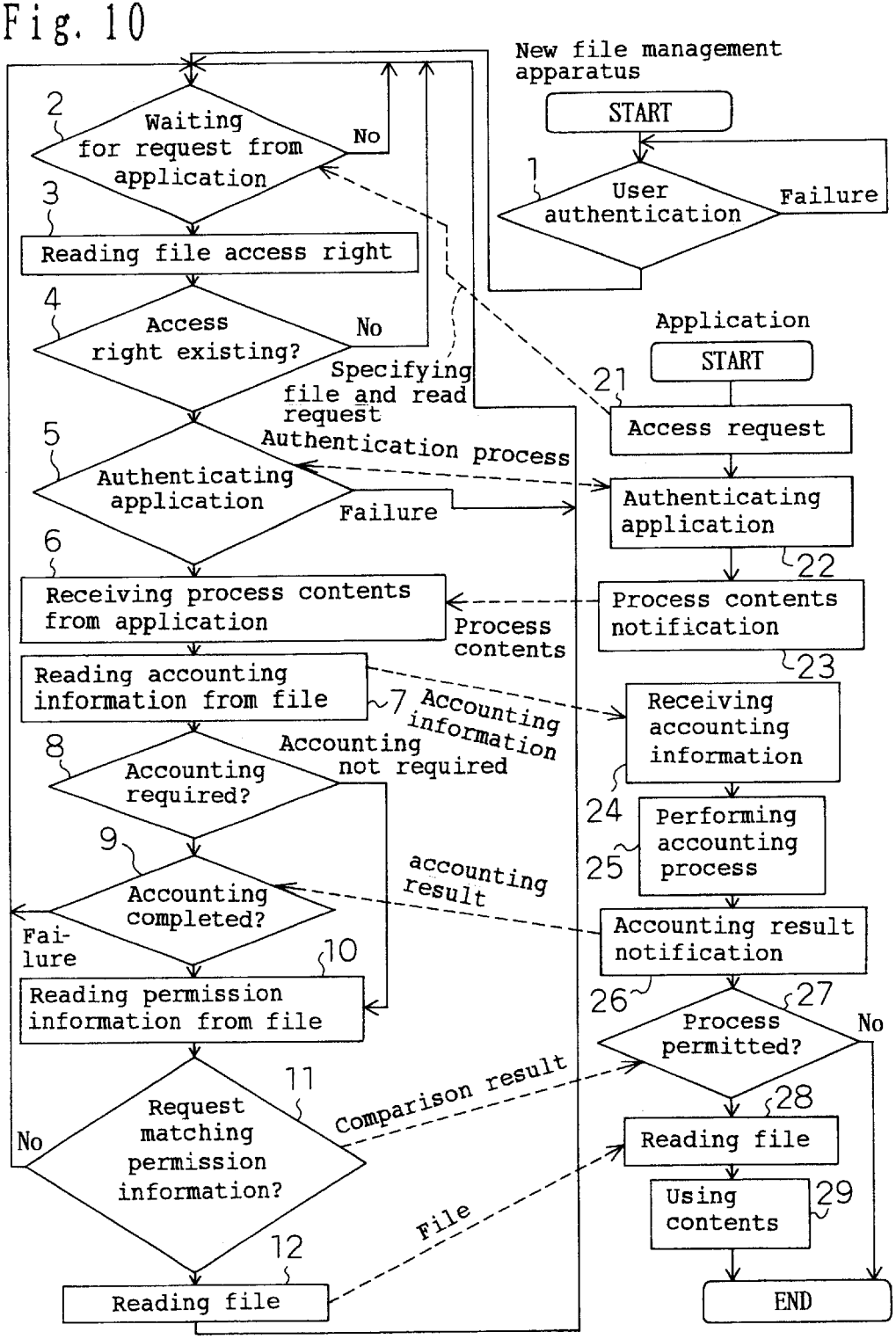
FIG. 10 is a flowchart, other than the flowchart shown in FIG. 8, of the operations of a new file management apparatus and the operations of an application of the file management system according to the fourth embodiment of the present invention.

In addition, according to the above described fourth embodiment, the accounting unit 18 provided in the new file management apparatus 17 determines the contents of the accounting information. If it is the accounting information that the user is requested to be charged a predetermined fee, then the accounting information is displayed on the display 9. However, with the configuration shown in FIG. 9, if the accounting software 22 of the application A 10 determines the contents of the accounting information and the information is the information that the user is requested to be charged a predetermined fee, the accounting information can be displayed on the display 9 (step 24 shown in FIG. 10). In this case, after the user pays a predetermined fee through the accounting software 22 of the application A 10, the application A 10 outputs the fee payment information to the comparison unit 13 of the new file management apparatus 21 (steps 25, 26, and 9 shown in FIG. 10), control is passed to step 11 shown in FIG. 10, and the operation similar to the operation in the first embodiment is performed.

Furthermore, a variation of the first embodiment is described in the above described fourth embodiment for convenience in explanation. Such a variation can also be applied to the second or third embodiment.

Fifth embodiment

The configuration and the operations of the file management system according to a fifth embodiment of the present invention are described below.

Figure 11:
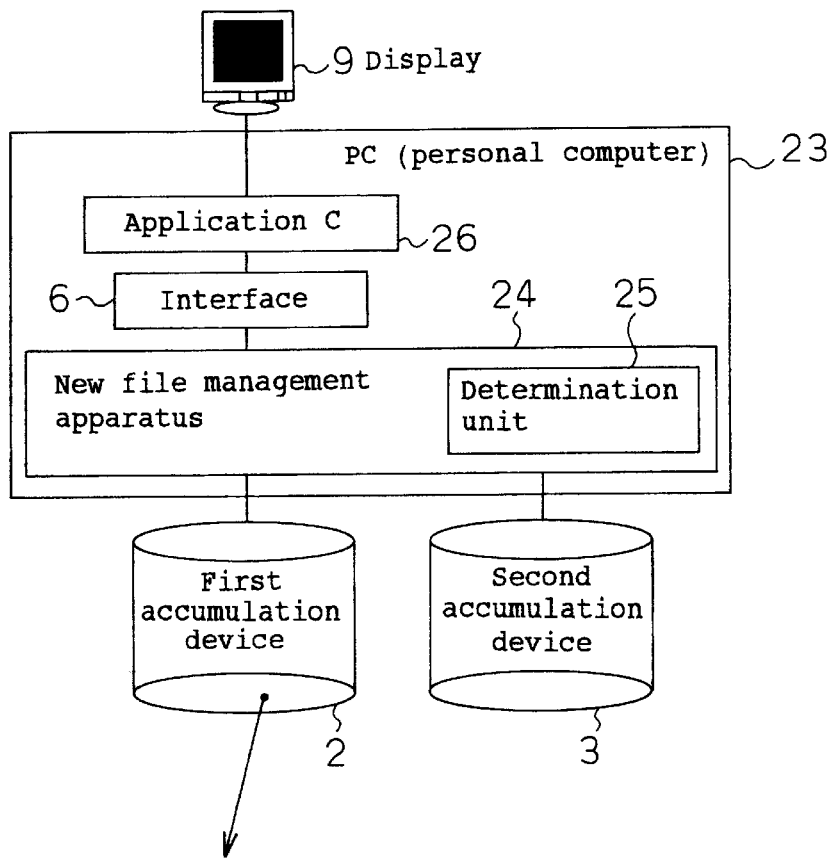
FIG. 11 is a block diagram of the file management system according to a fifth embodiment of the present invention.

The file management system according to the fifth embodiment comprises the personal computer 23, the first accumulation device 2, and the second accumulation device 3 as shown in FIG. 11. The personal computer 23 comprises, in addition to each component unit of the new file management apparatus 7 of the personal computer 1, the new file management apparatus 24 having the determination unit 25. The first accumulation device 2 accumulates the files H and I different from the files A and B. The user usage permission age information about the display is added to the access right information, the permission information, the contents data, and the display permission information in the file H as shown in FIG. 11. In addition, it is assumed that the application C 26 is a program having the function of displaying the contents of the file H or I on the display 9.

In addition, when the contents of the file H are to be displayed on the display 9 after the authentication according to the first embodiment has succeeded and before the comparison unit 13 provided in the new file management apparatus 24 reads the permission information about the file H, the determination unit 25 inputs the usage permission age information about the display of the file H from the first accumulation device 2. When the usage permission age information is the information specifying the user usage permission age range, the determination unit 25 receives the information about the user age from a user using a keyboard, etc., and determines whether or not the age is contained in the usage permission age range. Assuming that the user age is 25 for convenience in explanation, the age of 25 is contained in the usage permission age range about the display of the file H shown in FIG. 11, which is equal to or higher than 18. Therefore, control is passed to the next step 7 shown in FIG. 3 described in the first embodiment. Then, the operations similar to those according to the first embodiment are performed.

In the explanation above, the age of a user is assumed to be 25. When the age of the user is 15, it is not contained in the usage permission age range, which is equal to or higher than 18. Therefore, control is not passed to any step.

The file H has been described above. When a target file is the file I, there is no usage permission age information about a displaying operation, and the usage permission age range is not considered. If an authentication process is successfully performed, control is passed to the next step 7 shown in FIG. 3 described in the first embodiment. Then, the operations similar to those according to the first embodiment are performed.

In the above described fifth embodiment, the case in which the authentication process is successfully performed. However, if the process fails, the operations described in the first embodiment are performed.

Figure 12:
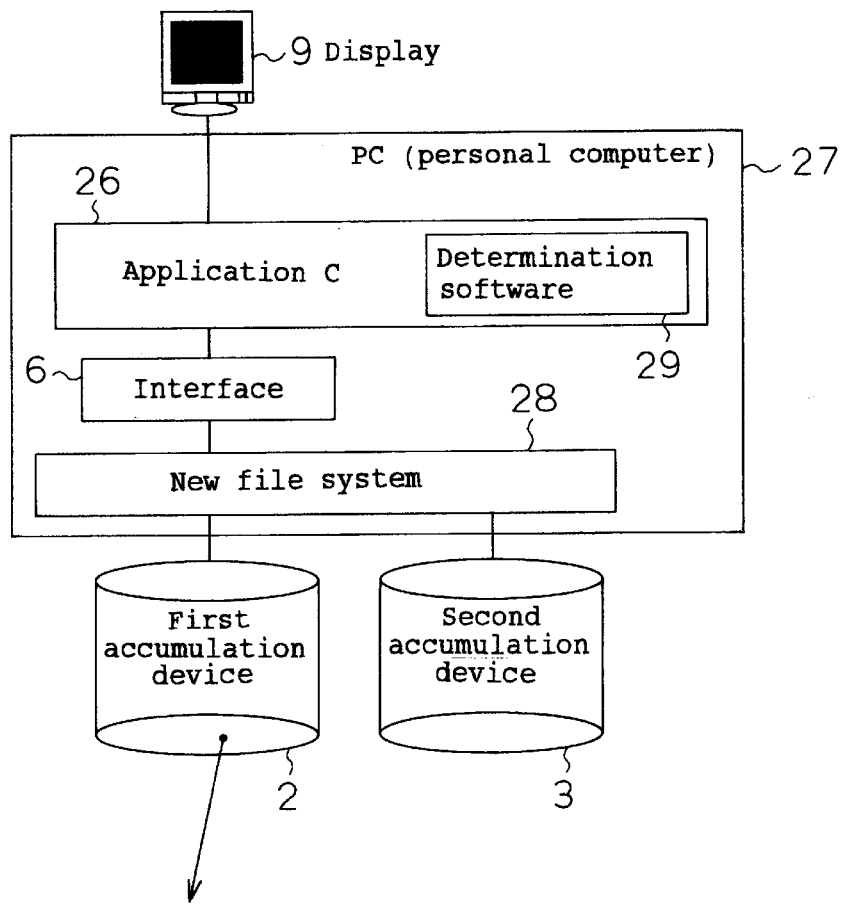
FIG. 12 is a block diagram, other than the block diagram shown in FIG. 11, of the file management system according to the fifth embodiment of the present invention.

In the above described fifth embodiment, the determination unit 25 provided in the new file management apparatus 24 determines whether or not the age of a user is contained in the usage permission age range. With the configuration shown in FIG. 12, the determination software 29 in the application C 26 can also determine whether or not the age of a user is contained in the usage permission age range. After the determination, when the age of a user is contained in the usage permission age range, control is passed to step 7 shown in FIG. 3 described in the first embodiment, and the operations described in the first embodiment are performed. When the age of the user is not in the usage permission age range, control is not passed to any step.

Furthermore, a variation of the first embodiment is described in the above described fifth embodiment for convenience in explanation. Such a variation can also be applied to the second or third embodiment.

Sixth Embodiment

The configuration and the operations of the file management system according to a sixth embodiment of the present invention are described below.

Figure 13:
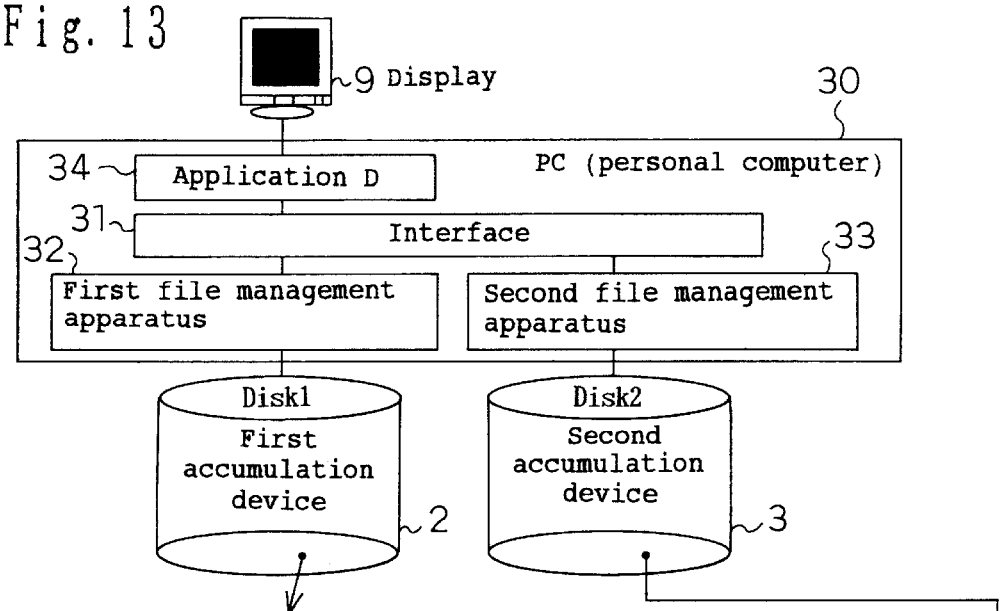
FIG. 13 is a block diagram of the file management system according to a sixth embodiment of the present invention.

The file management system according to the sixth embodiment comprises the personal computer 30, the first accumulation device 2, and the second accumulation device 3 as shown in FIG. 13. The personal computer 30 comprises the interface 31, the first file management apparatus 32, and the second file management apparatus 33. The first file management apparatus 32 and the second file management apparatus 33 are similar to the new file management apparatus 7 provided in the file management system according to the first embodiment. The first accumulation device 2 accumulates the files J and K. The files J and K contain the above described access right information, permission information, and the contents data. The second accumulation device 3 does not accumulate any file at this point. In addition, the first file management apparatus 32 is connected to the first accumulation device 2, and the second file management apparatus 33 is connected to the second accumulation device 3. The application D 34 is a program having the function of displaying the contents of the file accumulated in the first accumulation device 2 or the second accumulation device 3 on the display 9.

First, the first file management apparatus 32 encrypts and adds to the file J and K accumulated in the first accumulation device 2 a 'Disk1' as a non-rewritable identification value (ID) specific to the first accumulation device 2 for designation that the files J and K are accumulated in the first accumulation device 2 as shown in FIG. 13. Furthermore, the first file management apparatus 32 reads the file J or K to which the identification value 'Disk1' is added.

Then, it is assumed that the files J and K accumulated in the first accumulation device 2 are illegally copied to the second accumulation device 3 and accumulated therein through a disclosed interface such as SCSI or the like without through the first file management apparatus 32 and the second file management apparatus 33.

The purpose of the sixth embodiment is to prevent the accumulated files J and K from being illegally copied for use to the second accumulation device 3.

The usage of the file J accumulated in the first accumulation device 2 is described below. For convenience in explanation, the display of the contents of the file J on the display 9 by the application D 34 is used.

Figure 14:
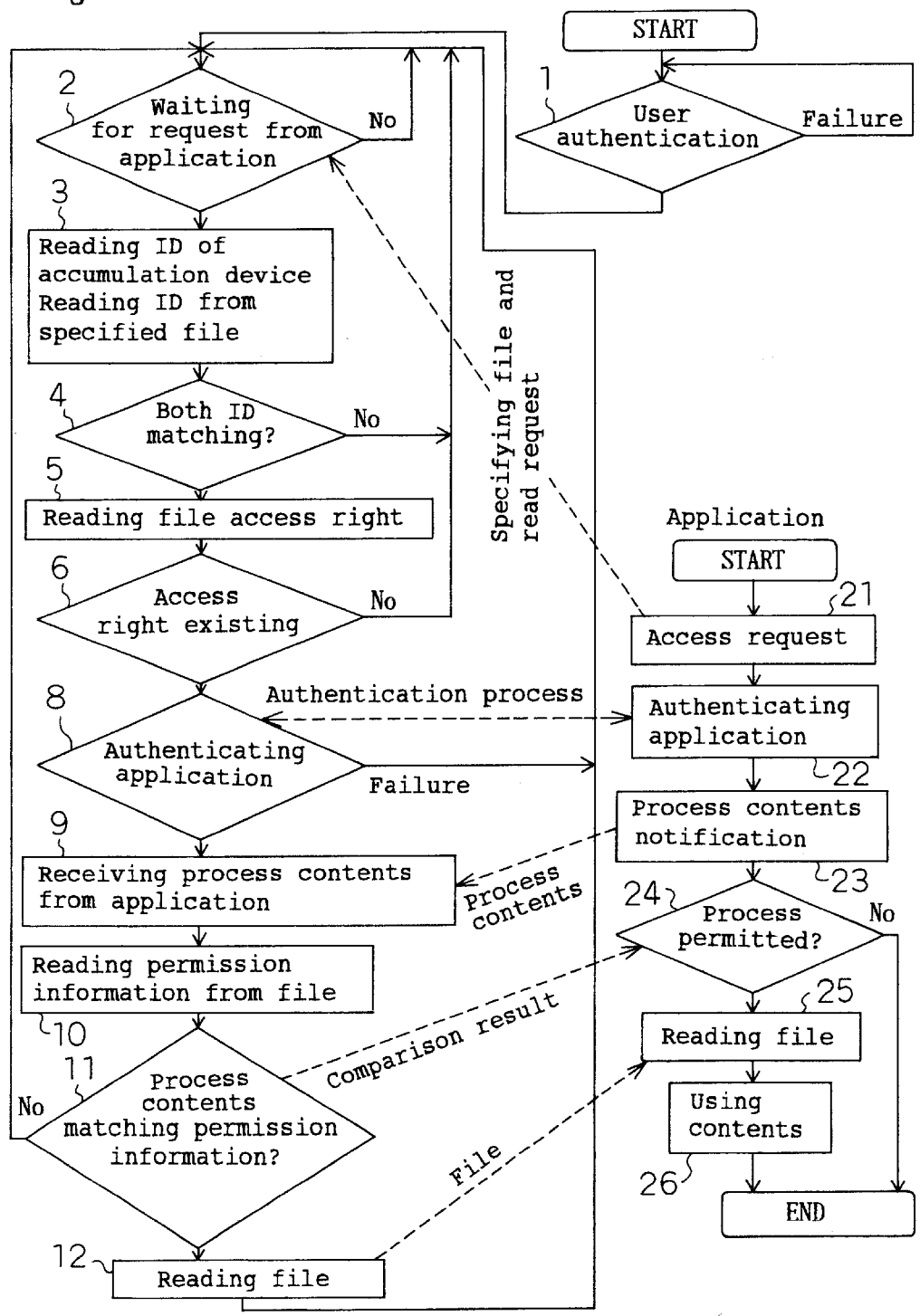
FIG. 14 is a flowchart of the operations of a file management apparatus and the operations of an application of the file management system according to the sixth embodiment of the present invention.
Figure 16:
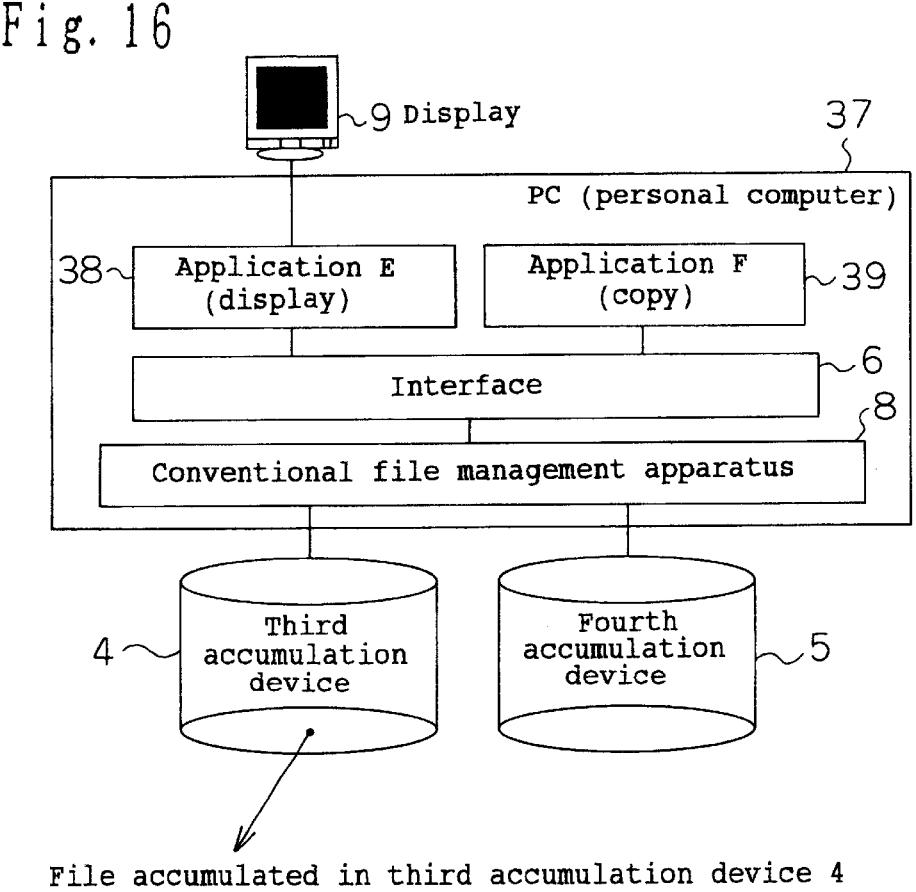
FIG. 16 is a block diagram of the conventional file management system.
Figure 17:
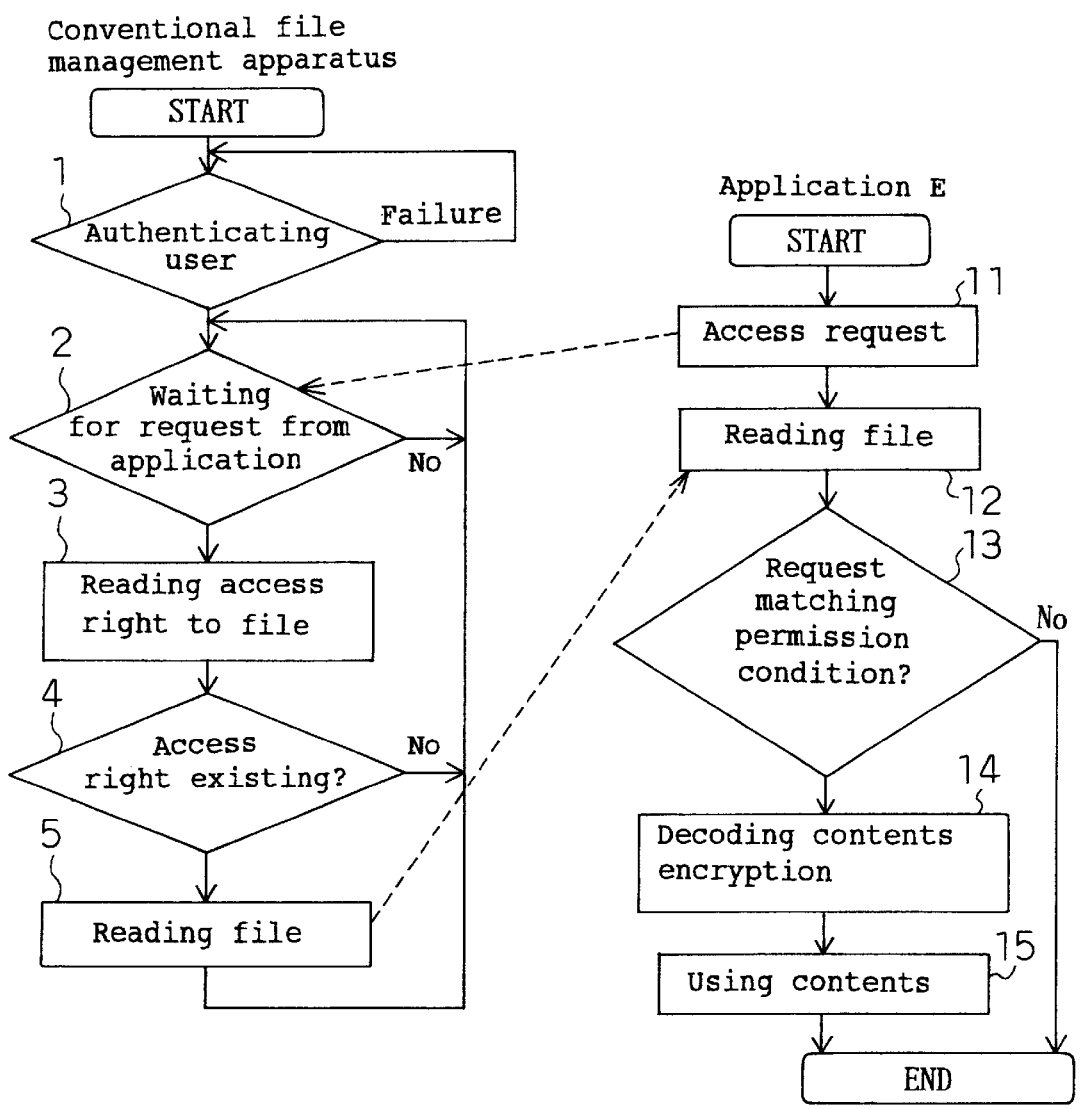
FIG. 17 is a first flowchart of the operations of the file management apparatus and the operations of the application of the conventional file management system.
Figure 18:
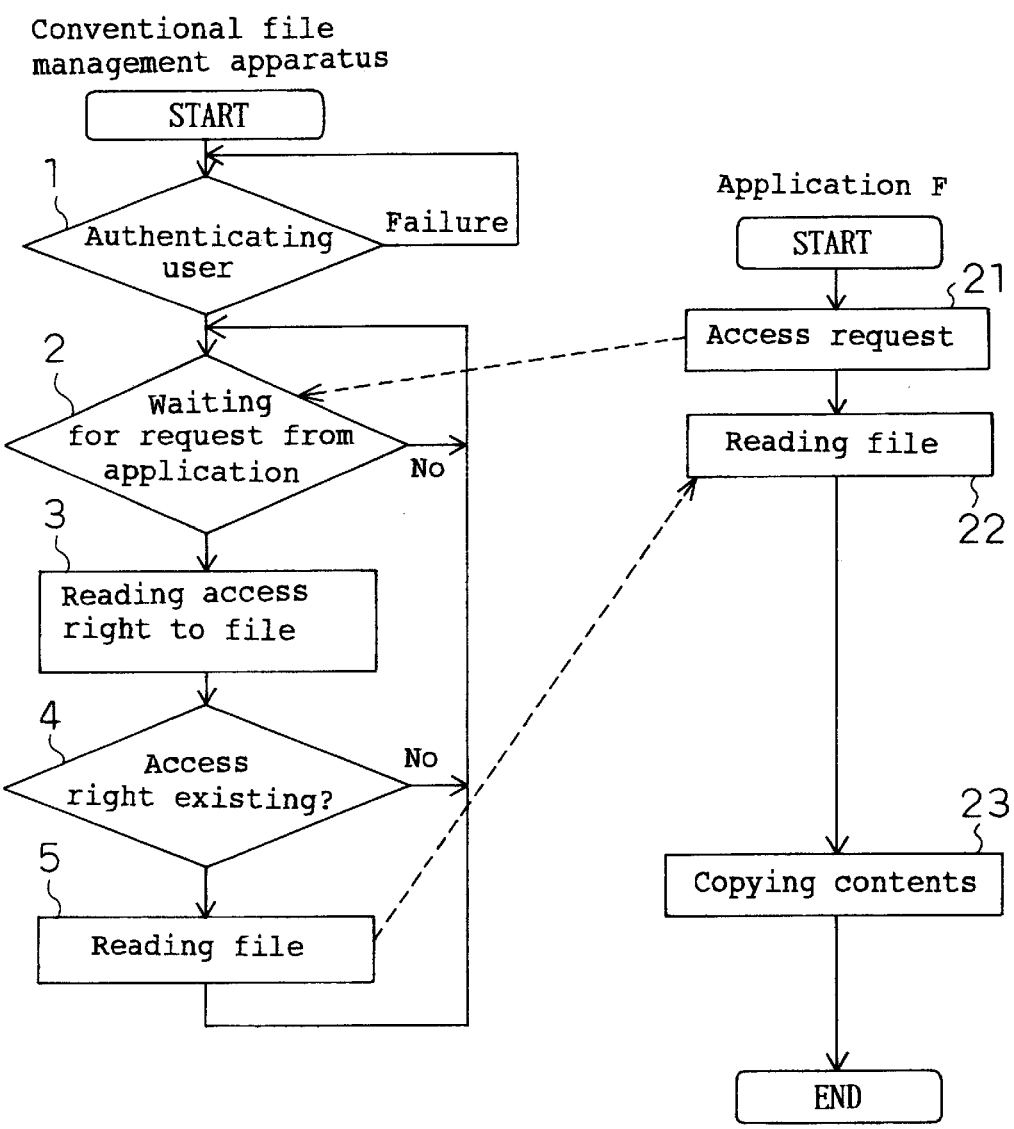
FIG. 18 is a second flowchart of the operations of the file management apparatus and the operations of the application of the conventional file management system.

The user issues an instruction to the personal computer 30 to display the contents of the file J accumulated in the first accumulation device 2 on the display 9. Then, the first file management apparatus 32 connected to the first accumulation device 2 checks the validity of the user as described in the first embodiment (step 1 shown in FIG. 14). When the validity of the user is checked, the first file management apparatus 32 inputs an access request from the application D 34 (step 2 shown in FIG. 14), inputs and reads an identification value (ID) of the first accumulation device 2, that is, a 'Disk1,' inputs and reads an identification value added to the file J from the first accumulation device 2, and decodes the encrypted identification value (step 3 shown in FIG. 14). Furthermore, the first file management apparatus 32 determines whether or not the decoded identification value matches the 'Disk1' (step 4 shown in FIG. 14). As described above, since the identification value added to the file J is 'Disk1,' it is determined that a matching result is obtained (step 4 shown in FIG. 14). After it is determined that a matching result is obtained, control is passed to step 5 shown in FIG. 14, that is, to step 3 shown in FIG. 3 described in the first embodiment. Afterwards, the operations described in the first embodiment are performed. The explanation about the operations is omitted here.

The target file described above has been described as the file J. Although the target file can be the file K, the file K is accumulated in the first accumulation device 2 and the identification value 'Disk1' is added. Therefore, the operations similar to those described about the file J are performed.

Described below is the usage of the file J accumulated in the second accumulation device 3. It is assumed that the usage is to display the contents of the file J by the application D 34 on the display 9.

First, the user issues an instruction to the personal computer 30 to display the contents of the file J accumulated in the second accumulation device 3 on the display 9. Then, the second file management apparatus 33 connected to the second accumulation device 3 checks the validity of the user as described above (step 1 shown in FIG. 14). When the validity of the user is checked, the second file management apparatus 33 inputs an access request from the application D 34 (step 2 shown in FIG. 14), inputs and reads an identification value (ID) of the second accumulation device 3, that is, a 'Disk2,' inputs and reads an identification value added to the file J from the second accumulation device 3, and decodes the encrypted identification value (step 3 shown in FIG. 14). Furthermore, the second file management apparatus 33 determines whether or not the decoded identification value matches the 'Disk2' (step 4 shown in FIG. 14). As described above, since the identification value added to the file J is 'Disk1,' it is determined that a non-matching result is obtained (step 4 shown in FIG. 14). Thus, if it is determined that a non-matching result is output, the second file management apparatus 33 terminates the operations.

The target file described above has been described as the file J. Although the target file can be the file K, the file K is accumulated in the second accumulation device 3 and the identification value 'Disk1' is added. Therefore, the identification values do not match. As a result, the second file management apparatus 33 terminates the operations.

As described above, the first file management apparatus 32 and the second file management apparatus 33 prevent the files illegally copied and accumulated from being used.

According to the above described sixth embodiment, as shown in FIG. 13, the personal computer 30 comprises the interface 31, the first file management apparatus 32, and the second file management apparatus 33. However, as shown in FIG. 15, the personal computer 35 comprising the interface 31 and the third file management apparatus 36 can replace the personal computer 30. At this time, it is assumed that the third file management apparatus 36 is connected to the first accumulation device 2 and the second accumulation device 3. In this case, when the files J and K accumulated in the first accumulation device 2 are illegally copied to the second accumulation device 3, and accumulated, the files J and K illegally accumulated in the second accumulation device 3 can be prevented from being used by the third file management apparatus 36 performing the operations similar to those of the second file management apparatus 33. That is, when the third file management apparatus 36 compares the identification value of the second accumulation device 3 with the identification value added to the file J or K. Only when a matching result is output, the file J or K is used, thereby preventing the file J or K illegally accumulated by the second accumulation device 3 from being used.

According to the above described sixth embodiment shown in FIG. 13, the first file management apparatus 32, the second file management apparatus 33, the first accumulation device 2, and the second accumulation device 3 are used but the number of the file management apparatuses and the accumulation devices is not limited to the value described above. However, each file management apparatus has to be connected to a corresponding accumulation device. Furthermore, in FIG. 15, the third file management apparatus 36, the first accumulation device 2, and the second accumulation device 3 are used, but the number of the accumulation devices is not limited to the above described value. However, the third file management apparatus 36 has to be connected to each accumulation device.

All or a part of the units and the components of the new file management apparatuses 7, 17, 21, 24, and 28, the first file management apparatus 32, the second file management apparatus 33, and the third file management apparatus 36 according to the above described first through sixth embodiments can be hardware and software having the function of the hardware.

The present invention relates to a program storage medium storing a program for directing a computer to execute each of the functions of all or a part of the units and the components of the new file management apparatuses 7, 17, 21, 24, and 28, the first file management apparatus 32, the second file management apparatus 33, and the third file management apparatus 36 according to the above described first through sixth embodiments.

Industrial Applicability

As described above, the present invention can provide a file management apparatus for processing a file with the permission information taken into account, a file management system provided with the file management apparatus, and a file management method.

That is, the present invention can provide a file management apparatus for preventing a file for which an author has a copyright to be protected from being displayed, copied, moved, backed up and/or processed without permission of the author, a file management system provided with the file management apparatus, and a file management method.

In addition, the present invention can provide a file management apparatus for controlling the processes divided into the processes of displaying, copying, moving, backing up and/or processing a file, and realizing both preventing illegal access and file convenience, the file management system provided with the file management apparatus, and a file management method.

What is claimed is:

1. A file management system comprising:
   an accumulation device accumulating a file to which information about process restriction on the file is added; and
   a file management apparatus performing an input/output process on the file, in consideration of a request for a process from an application accessing said file management system and according to the information about process restriction added to the file, wherein
   said file management apparatus compares the information about process restriction added to the file in said accumulation device with request contents of a process on the file from said application, determines whether or not the process should be performed on the file, inputs the file from said accumulation device based on the result, and outputs the file to the application;

said file management apparatus and said application comprise authentication units;

one of the authentication units performs an authentication process with another authentication unit;

said authentication unit of said file management apparatus checks whether or not said application is authenticated;

when the application is authenticated as a result of the authentication process, said file management apparatus determines whether or not the application can process the file; and when the application is not authenticated as a result of the authentication process, said file management apparatus reads all or a part of the information about process restriction added to the file in said accumulation device, and determines whether or not the application can process the file according to the read information.

2. The file management system according to claim 1, wherein:

said file management apparatus and said application comprise authentication units;

one of the authentication units performs an authentication process with another authentication unit;

said authentication unit of said file management apparatus checks whether or not said application is authenticated;

when the application is authenticated as a result of the authentication process, said file management apparatus determines whether or not the application can process the file; and when the application is not authenticated as a result of the authentication process, said file management apparatus does not accept the request to process the file from the application.

3. The file management system according to any one of claims 2 through 1, wherein:

there are a plurality of processes to be performed on the file;

said information about process restriction on the file independently exists for each process;

said information about process restriction for the each process is independently added to the file;

said file management apparatus compares the request contents of the process from the application with the information about process restriction corresponding to the process, and determines whether or not the application can process the file.

4. The file management system according to claim 1, wherein:

when the application is not authenticated, said file management apparatus inputs the file from said accumulation device and outputs the file to the application when all of the read information indicates that the file can be processed; and said file management apparatus does not accept the request to process the file from the application when any of the read information indicates that said file cannot be processed.

5. The file management system according to any one of claims 2 through 1, wherein:

said information about process restriction on the file refers to one of or a combination of information for determination as to whether or not the process can not include storing the file on a data storage medium accessing said file management system, information for determination as to whether or not the file can be copied, information for determination as to whether or not the file can be moved, information for determination as to whether or not the file can be backed up, and information for determination of whether or not the file can be processed.

6. The file management system according to claim 5, wherein said information about process restriction on the file contains information specifying a generation of the file to be copied.

7. The file management system according to claim 5, wherein said information about process restriction on the file contains information specifying a date when the file can be copied or moved.

8. The file management system according to any one of claims 2 through 1, wherein:

said information about process restriction on the file contains accounting information for each process;

said file management apparatus reads the accounting information corresponding to the process before determining whether or not the process can be performed by the application on the file when the application is authenticated;

when the accounting information indicates that a predetermined fee is required for the corresponding process, a user of the file management system is charged the predetermined fee;

said corresponding process is permitted after the predetermined fee is paid to a manager of the file; and when the accounting information indicates that a predetermined fee is not required for the corresponding process, the accounting information is not considered, and it is determined whether or not the process can be performed by the application on the file.

9. The file management system according to any one of claims 2 through 1, wherein:

said information about process restriction on the file contains accounting information for each process;

said application inputs the accounting information corresponding to the process before said file management apparatus determines whether or not the process can be performed by the application on the file when the application is authenticated;

when the accounting information indicates that a predetermined fee is required for the corresponding process, a user of the file management system is charged the predetermined fee;

said file management apparatus permits the corresponding process to be performed after the predetermined fee is paid to a manager of the file; and when the accounting information indicates that a predetermined fee is not required for the corresponding process, said file management apparatus does not consider the accounting information, and it is determined whether or not the process can be performed by the application on the file.

10. The file management system according to any one of claims 2 through 1, wherein:

said information about process restriction on the file contains usage permission age information about a user of the file management system for each process;

said file management apparatus reads the usage permission age information corresponding to the process before determining whether or not the process can be performed by the application on the file when the application is authenticated, when the usage permission age information specifies a usage permission age range of the user, it is determined whether or not the user age is in the usage permission age range, and it is determined whether or not the process cain be performed by the application on the file when the age is in the range; and when the usage permission age information does not specify the usage permission age range of the user, the usage permission age information is not considered, and it is determined whether or not the process can be performed by the application on the file.

11. The file management system according to any one of claims 2 through 1, wherein:

said information about process restriction on the file contains usage permission age information about a user of the file management system for each process;

said application inputs the usage permission age information corresponding to the process before said file management apparatus determines whether or not the application can process the file when the application is authenticated;

when the usage permission age information specifies a usage permission age range of the user, it is determined whether or not the user age is in the usage permission age range, and said file management apparatus determines whether or not the process can be performed by the application on the file when the age is in the range; and when the usage permission age information does not specify the usage permission age range of the user, said file management apparatus does not consider the usage permission age information, and determines whether or not the process can be performed by the application on the file.

12. A program storage medium storing a program of an application used in the file management system according to any one of claims 2 through 1.

13. The file management system of claim 1 wherein, the accumulation device includes plural sets of accumulation devices accumulating a file to which information about process restriction on the file is added; and said file management apparatus encrypts and adds to the file in a corresponding accumulation device a non-rewritable identification value specific to the accumulation device for specifying the corresponding accumulation device, and reads only the file to which the identification value of the corresponding accumulation device is added.

14. The file management system of claim 1 wherein:

the accumulation device includes a plurality of accumulation devices accumulating a file to which information about process restriction on the file is added; and said file management apparatus encrypts and adds to the file accumulated in each of the plurality of accumulation devices a non-rewritable identification value specific to the accumulation device for specifying a corresponding accumulation device, and reads only the file accumulated in an accumulation device corresponding to an added identification value.

15. The file management system of claim 1, wherein to a file in the accumulation device connected to the file management apparatus, a non-rewritable identification value specific to the accumulation device for specifying the accumulation device is encrypted and added, and only the file to which the identification value of the accumulation device is added is read.

16. The file management system of claim 1 wherein the accumulation device includes a plurality of accumulation devices accumulating a file to which information about process restriction on the file is added; and to a file accumulated in each of the plurality of the accumulation devices connected to the file management apparatus, a non-rewritable identification value specific to the accumulation device for specifying the corresponding accumulation device is encrypted and added, and only the file accumulated in the accumulation device corresponding to an added identification value is read.

17. A program storage medium storing a program for directing a computer to perform all or a part of each function of the file management system according to claim 1.

18. A file management apparatus comprising:

a comparison unit comparing information about process restriction on a file in an accumulation device connected to the file management apparatus with request contents of a process on the file from the application accessing the file management apparatus; and an input/output unit determining whether or not the file can be processed based on a comparison result of said comparison unit, and inputting the file from said accumulation device and outputting the file to the application based on the result;

said file management apparatus comprises an authentication unit;

said authentication unit and an authentication unit of the application perform an authentication process with each other;

said authentication unit of the file management apparatus checks whether or not the application can be authenticated;

when the application is authenticated as a result of the authentication process, said comparison unit performs the comparison process, and said input/output unit determines whether or not the application can process the file; and when the application is not authenticated as a result of the authentication process, said comparison unit reads all or a part of the information about process restriction added to the file in said accumulation device, and said input/output unit determines whether or not the application can process the file according to the read information.

19. The file management apparatus according to claim 18, wherein:

said file management apparatus comprises an authentication unit;

said authentication unit and an authentication unit of the application perform an authentication process with each other;

said authentication unit of the file management apparatus checks whether or not the application can be authenticated;

when the application is authenticated as a result of the authentication process, said comparison unit performs the comparison process, and said input/output unit determines whether or not the application can process the file; and when the application is not authenticated as a result of the authentication process, said comparison unit does not accept the request to process the file from the application, and does not perform the comparison process.

20. The file management apparatus according to any one of claims 19 through 18, wherein said information about process restriction on the file refers to one of or a combination of information for determination as to whether or not the process cannot include storing the file on a data storage medium accessing the file management apparatus, information for determination as to whether or not the file can be copied, information for determination as to whether or not the file can be moved, information for determination as to whether or not the file can be backed up, and information for determination of whether or not the file can be processed.

21. The file management apparatus according to claim 20, wherein said information about process restriction on the file contains information specifying a generation of the file to be copied.

22. The file management apparatus according to claim 20, wherein said information about process restriction on the file contains information specifying a date of copying or moving the file when the file can be copied or moved.

23. The file management apparatus according to any one of claims 19 through 18, wherein:
there are a plurality of processes to be performed on the file;
said information about process restriction on the file independently exists for each process;
said the information about process restriction for each process is independently added to the data;
said comparison unit compares the request contents of the process from the application with the information about process restriction corresponding to the process.

24. The file management apparatus according to any one of claims 19 through 18, wherein:
said information about process restriction on the file contains accounting information for each process;
said file management apparatus comprises an accounting unit for performing an accounting process according to the accounting information;
said accounting unit reads the accounting information corresponding to the process using said input/output unit before determining whether or not the process can be performed by the application on the file when the application is authenticated by the authentication unit;
when the accounting information indicates that a predetermined fee is required for the corresponding process, said accounting unit charges a user of the file management apparatus the predetermined fee, and then said input/output unit permits the corresponding process after the predetermined fee is paid to the file manager; and
when the accounting information indicates that a predetermined fee is not required for the corresponding process, said input/output unit does not consider the accounting information, and determines whether or not the process can be performed by the application on the file.

25. The file management apparatus according to any one of claims 19 through 18, wherein:
said information about process restriction on the file contains accounting information for each process,
said file management apparatus passes the accounting information to the authenticated application;
when the accounting information indicates that a predetermined fee is required for the corresponding process,
said input/output unit permits the corresponding process after a user of the file management apparatus pays the predetermined fee to the file manager;
when the accounting information indicates that a predetermined fee is not required for the corresponding process, said input/output unit does not consider the accounting information, and determines whether or not the process can be performed by the application on the file.

26. The file management apparatus according to any one of claims 19 through 18, wherein:
said information about process restriction on the file contains usage permission age information about a user of the file management apparatus for each process;
said file management apparatus comprises a determination unit for performing a predetermined process according to the usage permission age information, and, when the authentication unit authenticates the application;
said determination unit reads the usage permission age information corresponding to the process before said input/output unit determines whether or not the process on the file can be performed by the application;
when the usage permission age information specifies a usage permission age range of the user, said determination unit determines whether or not the user age is in the usage permission age range, and said input/output unit permits the corresponding process when the age is in the range; and
when the usage permission age information does not specify the usage permission age range of the user, said input/output unit does not consider the usage permission age information, and determines whether or not the process can be performed by the application on the file.

27. The file management apparatus according to any one of claims 19 through 18, wherein:
said information about process restriction on the file contains usage permission age information about a user of the file management apparatus for each process;
said file management apparatuses passes the usage permission age information to the authenticated application;
when the usage permission age information specifies the usage permission age range of the user, and when the application determines that the user age is in the usage permission age range, said input/output unit permits the corresponding process; and
when the usage permission age information does not specify the usage permission age range of the user, said input/output unit does not consider the usage permission age information, and determines whether or not the process can be performed by the application on the file.

28. A program storage medium, characterized by storing a program for directing a computer to perform all or a part of each function of each component of the file management apparatus according to any one of claims 19 through 18.

29. The file management apparatus according to claim 18, wherein:
when the application is not authenticated, said input/output unit inputs the file from said accumulation device and outputs the file to the application when all of the read information indicates that the file can be processed; and said input/output unit does not input the file from said accumulation device, and does not output the file to the application when any of the read information indicates that a file cannot be processed.

30. In a computer system having a file stored in memory, a file manager and an application program accessing the file, a method for managing access to the file comprising the steps of:

(a) adding processing restriction information to the file, including at least access permission status and processing permission status;

(b) requesting the file manager access of the file by the application program;

(c) checking the access permission status in the file by the file manager;

(d) authenticating the application program, if step (c) determines that the file is accessible;

(e) requesting a processing task of the file by the application program, after step (d) authenticates the application program;

(f) checking the processing permission status in the file by the file manager;

(g) comparing the processing permission status in the file with the requested processing task in step (e);

(h) permitting the application program to access the file, after step (g) determines that the requested processing task matches the processing permission status in the file; and when the application program is not authenticated, reading information about processing restriction in the processing permission status in the file by the file manager and determining whether the application program is permitted to process the file according to the reading information.

31. The method of claim 30, including the steps of:

comparing information about process restriction on a file in an accumulation device accumulating the file to which the information about process restriction on the file is added with request contents of a process of the file from an application accessing the file management system;

determining whether or not the process can be performed on the file based on the comparison; and inputting the file from said accumulation device based on the result, and outputting the file to the application.

32. The method of claim 30 including, the steps of:

encrypting and adding a non-rewritable identification value specific to an accumulation device for specifying the accumulation device to a file in the accumulation device accumulating files; and reading only the file to which the identification value of said accumulation device is added.

33. The method of claim 30 including, the steps of:

encrypting and adding a non-rewritable identification value specific to an accumulation device for specifying the accumulation device corresponding to a file accumulated in each of a plurality of accumulation devices accumulating files; and reading only the file accumulated in an accumulation device corresponding to an added identification value.

34. The method of claim 30 wherein the processing permission status and the processing task, each includes at least one of displaying, copying, moving, backing-up and manipulating.

* * * * *

UNITED STATES PATENT AND TRADEMARK OFFICE
CERTIFICATE OF CORRECTION

PATENT NO. : 6,684,210 B1 Page 1 of 1
DATED : January 27, 2004
INVENTOR(S) : Takechi et al.

It is certified that error appears in the above-identified patent and that said Letters Patent is hereby corrected as shown below:

<u>Title page,</u>
Item [54], Title, should read:
-- FILE MANAGEMENT SYSTEM PROVIDING SECURITY FOR FILES BY AUTHENTICATING AN APPLICATION SEEKING FILE ACCESS AND STORING RESTRICTION INFORMATION TO LIMIT THE TYPE OF ACCESS --.

Signed and Sealed this

Thirteenth Day of July, 2004

JON W. DUDAS
*Acting Director of the United States Patent and Trademark Office*